(12) United States Patent
Thomas

(10) Patent No.: US 8,075,138 B2
(45) Date of Patent: Dec. 13, 2011

(54) SYSTEM AND METHODS FOR ANGULAR SLICE TRUE 3-D DISPLAY

(75) Inventor: Clarence E. Thomas, Knoxville, TN (US)

(73) Assignee: Third Dimension IP LLC, Knoxville, TN (US)

( * ) Notice: Subject to any disclaimer, the term of this patent is extended or adjusted under 35 U.S.C. 154(b) by 415 days.

(21) Appl. No.: 12/391,178

(22) Filed: Feb. 23, 2009

(65) Prior Publication Data

US 2010/0214537 A1 Aug. 26, 2010

(51) Int. Cl.
G03B 21/14 (2006.01)
(52) U.S. Cl. ............... 353/7; 353/94; 359/472; 359/458
(58) Field of Classification Search .................. 353/7, 8, 353/10; 359/462, 466, 471, 472, 458; 348/42, 348/51.54, 59
See application file for complete search history.

(56) References Cited

U.S. PATENT DOCUMENTS

| | | | |
|---|---|---|---|
| 3,814,513 A | 6/1974 | Nims | |
| 4,799,739 A | 1/1989 | Newswanger | |
| 5,379,133 A | 1/1995 | Kirk | |
| 5,855,425 A | 1/1999 | Hamagishi | |
| 5,993,003 A | 11/1999 | McLaughlin | |
| 6,229,561 B1 | 5/2001 | Son | |
| 6,533,420 B1 | 3/2003 | Eichenlaub | |
| 6,665,100 B1 | 12/2003 | Klug | |
| 6,877,857 B2 | 4/2005 | Perlin | |
| 2005/0213182 A1 | 9/2005 | Cossairt | |
| 2006/0256302 A1 | 11/2006 | Hsu | |
| 2007/0139767 A1 | 6/2007 | Yoshikawa | |

FOREIGN PATENT DOCUMENTS

| | | |
|---|---|---|
| JP | 2002184402 | 6/2002 |
| WO | WO99/39513 | 8/1999 |
| WO | WO2005/117458 | 12/2005 |

*Primary Examiner* — William C Dowling
(74) *Attorney, Agent, or Firm* — Law Offices of Mark L Berrier

(57) ABSTRACT

Systems and methods for generating a true 3-D display, where each of a viewer's eyes not only sees a different scene, but the scene changes continuously as the viewer moves his/her head or change his/her position from one angular location to another angular location with respect to the display screen. In one embodiment, a system comprises a set of 2-D image projectors and a display screen. The 2-D image projectors are configured to project individual 2-D images substantially in focus on the display screen. The display screen then diffuses (or reflects) each pixel from each of the 2-D images into a small angular slice. This enables the viewer observing the display screen to see a different one of the 2-D images with each eye. Further, the image seen by each eye varies as the viewer moves his or her head with respect to the display screen.

13 Claims, 19 Drawing Sheets

SYSTEM AND METHODS FOR ANGULAR SLICE TRUE 3-D DISPLAY

CROSS-REFERENCE TO RELATED APPLICATIONS

This application claims the benefit of U.S. patent application Ser. No. 11/736,063, filed Apr. 17, 2007, which claims the benefit of U.S. Provisional Patent Application 60/744,977, filed Apr. 17, 2006, both of which are incorporated by reference as if set forth herein in their entirety.

BACKGROUND

1. Field of the Invention

The present invention relates generally to the field of three-dimensional (3-D) displays. More specifically, the invention relates to a system and methods for true 3-D display suitable for multiple viewers without use of glasses or tracking of viewer position, where each of the viewers' eyes sees a slightly different scene (stereopsis), and where the scene viewed by each eye changes as the eye changes position (parallax).

2. Related Art

Over the last 100 years, significant efforts have gone into developing three-dimensional (3-D) displays. To date none of these efforts have been truly satisfactory. There are existing 3-D display technologies, including DMD (digital-mirror-device, Texas Instruments) projection of illumination on a spinning disk in the interior of a globe[1] (Actuality Systems); another volumetric display consisting of multiple LCD scattering panels that are alternately made clear or scattering to image a 3-D volume[2] (LightSpace/Vizta3D); stereoscopic systems requiring the user to wear goggles ("Crystal Eyes" and others); two-plane stereoscopic systems (actually dual 2D displays with parallax barrier, e.g. Sharp Actius RD3D); and lenticular stereoscopic arrays[3] (many tiny lenses pointing in different directions, e.g., Phillips nine-angle display, SID, Spring 2005). Most of these systems are not particularly successful at producing a true 3-D perspective at the users eye or else are inconvenient to use, as evidenced by the fact that the reader probably won't find one in her/his office. The Sharp notebook only provides two views (left eye and right eye, with a single angle for each eye), and the LightSpace display appears to produce very nice images, but in a limited volume (all located inside the monitor,) and would be very cumbersome to use as a projection display.

Beyond these technologies there are efforts in both Britain and Japan to produce a true holographic display. Holography was invented in the late 1940s by Gabor[4] and started to flourish with the invention of the laser and off-axis holography[5,6]. The British work is farthest along[11], and has actually produced a display that has a ~7 cm extent and an 8 degree field of view (FOV). While this is impressive, it requires 100 million pixels (Mpixels) to produce this 7 cm field in monochrome and, due to the laws of physics, displays far more data than the human eye can resolve from working viewing distances. A working 50 cm (20 inch) color holographic display with a 60-degree FOV would require 500 nanometer (nm) pixels (at least after optical demagnification, if not physically) and more than a Terapixel (1,000 billion pixels) display. These numbers are totally unworkable anytime in the near future, and even going to horizontal parallax only (HPO, or three-dimensional in the horizontal plane only) just brings the requirement down to 3 Gpixels (3 billion pixels.) Even 3 Gpixels per frame is still a very unworkable number and provides an order of magnitude more data than the human eye requires in this display size at normal working distances. Typical high-resolution displays have 250-micron pixels—a holographic display with 500 nm pixels would be a factor of 500 more dense than this—clearly far more data would be contained in a holographic display than the human eye needs or can even make use of at normal viewing distances. Much of this incredible data density in a true holographic display would just go to waste.

FIG. 1 shows a present generation volumetric 3-D display. The technology is amazing, but a spinning object enclosed in a glass bowl is a poor candidate for interactive technologies, immersive technologies, or remote collaboration since it gives no chance of being involved in the scene. It also has the even more difficult problem of all objects in the display being transparent.

Another form of volumetric 3-D display has been proposed by Balogh[12,13,14,15] and developed by Holografika. This system does not create an image on the viewing screen, but rather projects beams of light from the viewing screen to form images by intersecting the beams at a pixel point in space (either real—beams crossing between the screen and viewer, or virtual—beams apparently crossing behind the screen as seen by the viewer). Resolution of this type of device is greatly limited by the divergence of the beams leaving the screen, and the required resolution (pixel size and total number of pixels) starts to become very high for significant viewing volumes.

Eichenlaub[16] teaches a method for generating multiple autostereoscopic (3-D without glasses) viewing zones (typically eight are mentioned) using a high-speed light valve and beam-steering apparatus. This system does not have the continuously varying viewing zones desirable for a true 3-D display, and has a large amount of very complicated optics. Neither does it teach how to place the optics in multiple horizontal lines (separated by small vertical angles) so that continuously variable autostereoscopic viewing is achieved. It also has the disadvantage of generating all images from a single light valve (thus requiring the very complicated optical systems), which cannot achieve the bandwidth required for continuously variable viewing zones.

Nakamuna, et al.[17], have proposed an array of micro-LCD displays with projection optics, small apertures, and a giant Fresnel lens. The apertures segregate the image directions and the giant Fresnel lens focuses the images on a vertical diffuser screen. This system has a number of problems including: 1) extremely poor use of light (most of the light is thrown away due to the apertures); 2) exceedingly expensive optics and lots of them, or alternatively very poor image quality; 3) very expensive electronics for providing the 2-D array of micro-LCD displays.

SUMMARY OF THE INVENTION

Therefore, there is a clear need for a method to generate a true 3-D display, where each of the viewers' eyes not only sees a different scene, but the scene changes continuously as the viewers move their heads or change their positions from one angular location to another angular location with respect to the display screen. Multiple "angular slices" (scenes as viewed by a camera from a particular angular vantage point) are projected on to a viewing screen. If necessary (i.e., if the viewing angle is larger than projection angle), the viewing screen diffuses the angle illuminated by the projection lens projecting the scene into a particular vertical and horizontal angular slice, where the diffusion may be asymmetric. A viewer observing the display screen will see the portion of a 3-D scene that a ray projected from her eye through a projection lens illuminating that pixel for the particular angular slice would strike in a 3-D scene. For high-resolution viewing the departing angle from each pixel for each angular slice is the order of one degree or less. In particular for a horizontal parallax only (HPO—providing a 3-D image in the horizontal dimension only) 3-D display, N complete images are projected on to the display (and substantially in focus at the display) from N horizontal angular positions relative to the display. Each pixel on the display projects the light from a particular image into a large vertical angle (i.e., it can be viewed vertically over a very large angle,) but the light is diffused horizontally into angular slices such that the light from each projection through a particular pixel is diffused into a horizontal angular slice equal to the horizontal angular field-of-view (FOV) of the display divided by N. Thus if $\alpha$ is the horizontal angular FOV, then the light from a particular pixel on the display illuminated by the n'th projection lens is diffused into a horizontal angle $\alpha/N$ centered on the angle at which the n'th image projection strikes the pixel. The number of images projected on to the diffusive viewing screen can be increased either to increase the resolution of the display (each angular slice is projected into a smaller viewing angle) or to increase the FOV of the display (additional angular slices with the same incremental viewing angle are added to increase the total FOV of the display). Similarly, for full parallax viewing an array of projectors with horizontal dimension N projectors and vertical dimension M projectors is used, and the angular slice for each display is the horizontal FOV divided by N and the vertical FOV divided by M, with corresponding required diffusion angles of the projections. For the full-parallax case the angular diffusion of the projector itself may be adequate, and either no display screen or a simple blackened display screen may be provided. Otherwise the display screen must provide the horizontal and vertical diffusion as required.

BRIEF DESCRIPTION OF THE DRAWINGS

A clear conception of the advantages and features constituting the present invention, and of the components and operation of model systems provided with the present invention, will become more readily apparent by referring to the exemplary, and therefore nonlimiting, embodiments illustrated in the drawings accompanying and forming a part of this specification.

DETAILED DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well-known components and processing techniques are omitted so as to not unnecessarily obscure the present invention in detail.

System Overview

The present invention provides a true 3-D display. That is, when the observer moves her head to a new viewing angle, she sees something that was previously not visible, just as when an observer moves his head to the right in the real world, he can see things around a corner on his left that were not previously visible. Note immediately that for a normal 2D display this is not true—when the viewer moves her head, the scene remains the same—nothing new is visible. This is also true for dual-view stereoscopic and autostereoscopic displays—while a different view is provided for each eye, when the viewer moves his head nothing new is visible, and in fact part of the scene and/or the stereoscopic effect may disappear.

Figure 1:
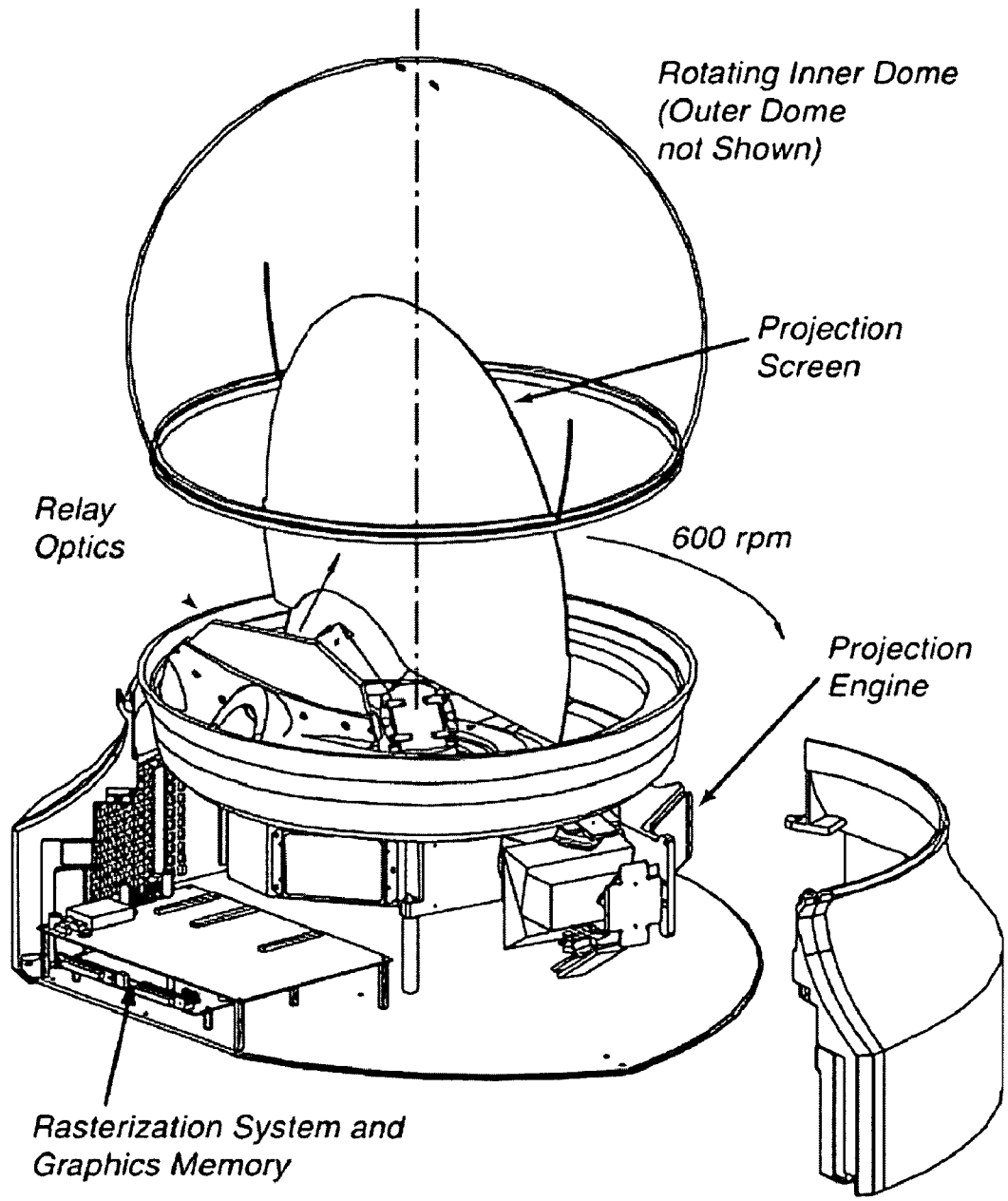
FIG. 1 schematically depicts a Prior Art Actuality Systems rotating volumetric display. Illuminated DMD devices paint a 3-D image on a rapidly rotating screen. The technology to do this is extremely impressive, but hidden lines cannot be removed (all pixels are transparent—can be seen through), scaling to larger sizes is very difficult, and interactivity is similarly extremely difficult.
Figure 2:
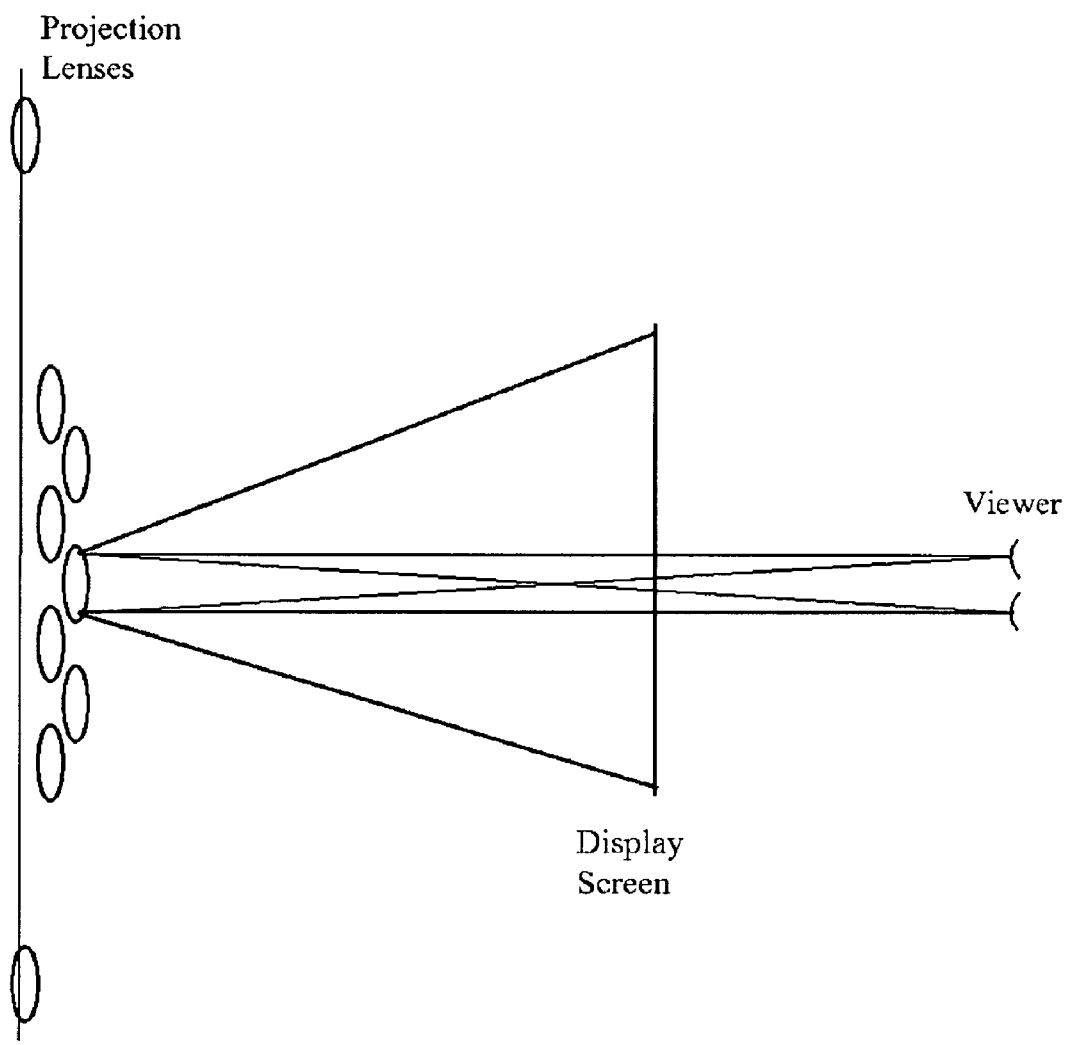
FIG. 2 illustrates the vertical slices seen by each eye when viewing the field projected on the display screen by a single projection lens for an HPO system. This is a top view illustrating the fact that each eye sees only a small vertical slice from a particular projection lens, and also that each eye sees a different vertical stripe from that projection lens. The horizontal angular extent of the vertical stripe seen by a particular eye is defined by a combination of the horizontal angular diffusion of the display screen and the horizontal angular extent of the rays passing through a particular pixel from that single projection lens.
Figure 3:
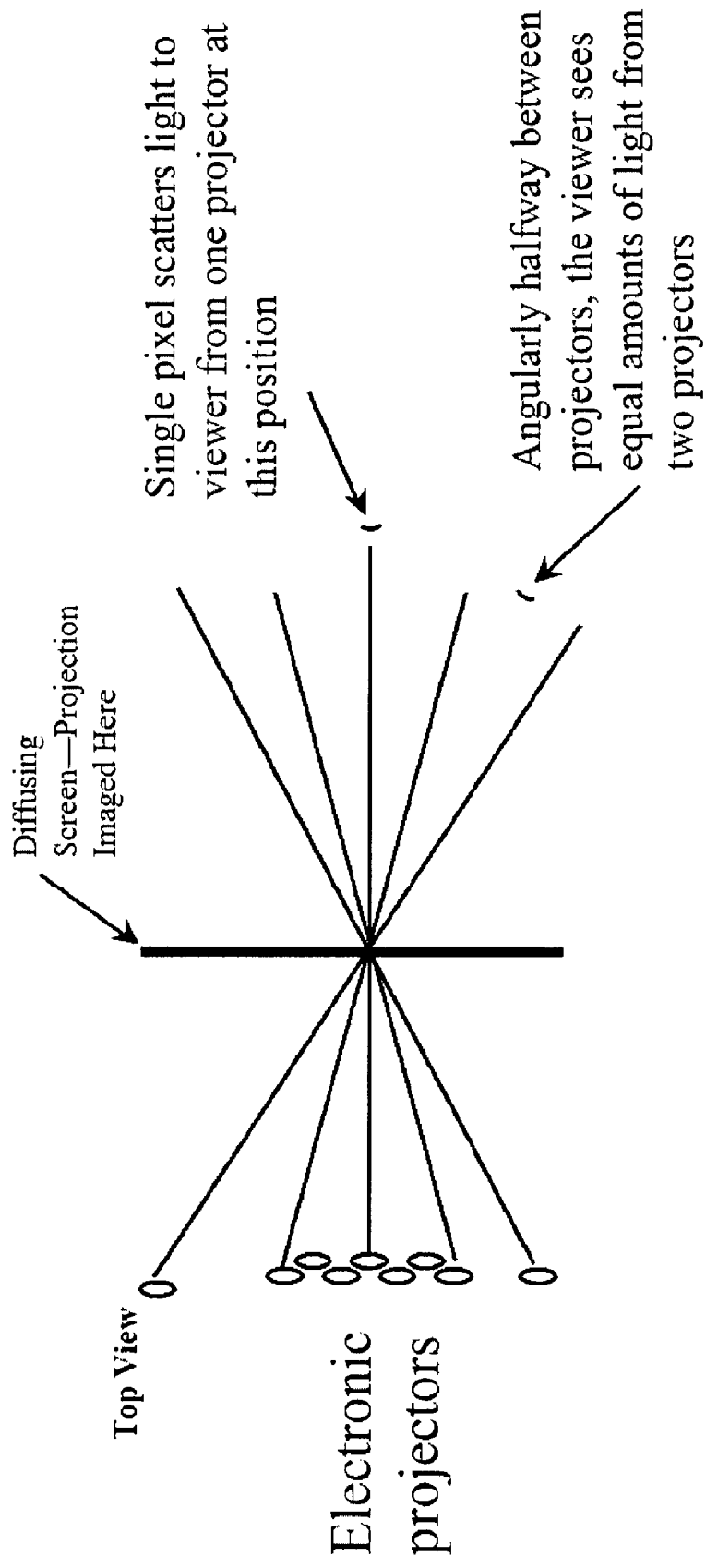
FIG. 3 illustrates Angular Slices schematically from the point of view of a single pixel for an HPO system. Looking down from the top, the pixel on the HOE (holographic optical element) diffusing screen is illuminated by N electronic projectors (each projector images a single pixel at that point on the screen). The light from each of the projectors strikes the diffusing screen at a slightly different horizontal angle. The diffusing screen diffuses the light into a wide angle vertically (say 60 degrees or so vertically) but into a very narrow angle horizontally (say ~0.5 to ~1 degree horizontally). Thus the image of the pixel from any single projector is visible at all useful vertical positions but only in a very narrow slice of horizontal angles. The horizontal diffusion/scattering angle of the HOE display screen is chosen to match the angle between projectors. Therefore, as the viewer changes position the light from one projector blends into the light from the next projector. This allows true 3D display in the horizontal plane—each eye (since it sees a different angle) sees a different view of the scene (stereopsis) and as the viewer changes her position, the view that each eye sees changes (parallax).
Figure 4:
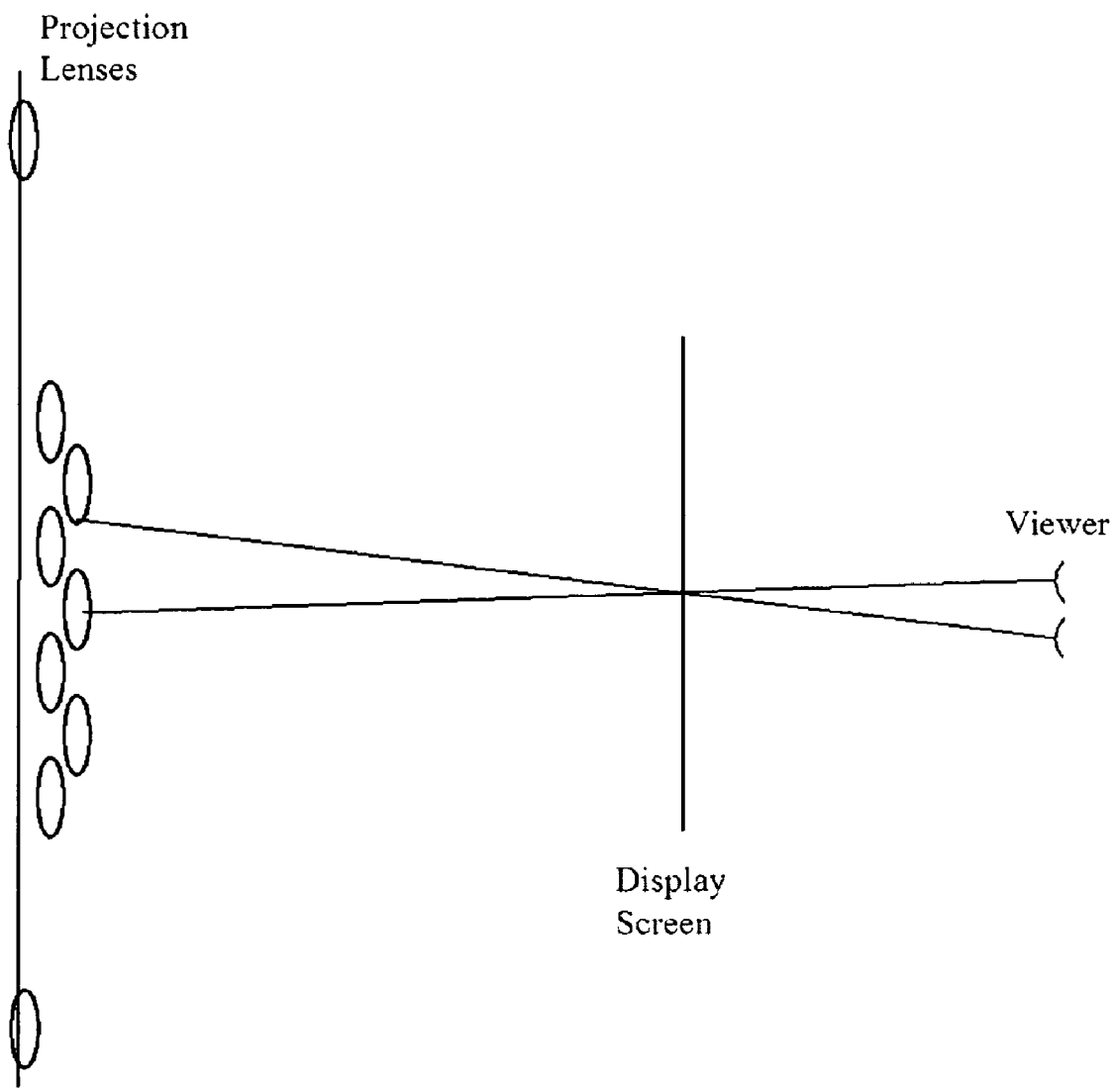
FIG. 4 demonstrates how stereopsis is achieved with the Angular Slice Display. A top view of the display screen and projection lenses shows that for a particular vertical slice, each eye sees a projection from a different lens, so that stereopsis can be achieved by projecting a view from the corresponding slightly different angle through each of the projection lenses.
Figure 5:
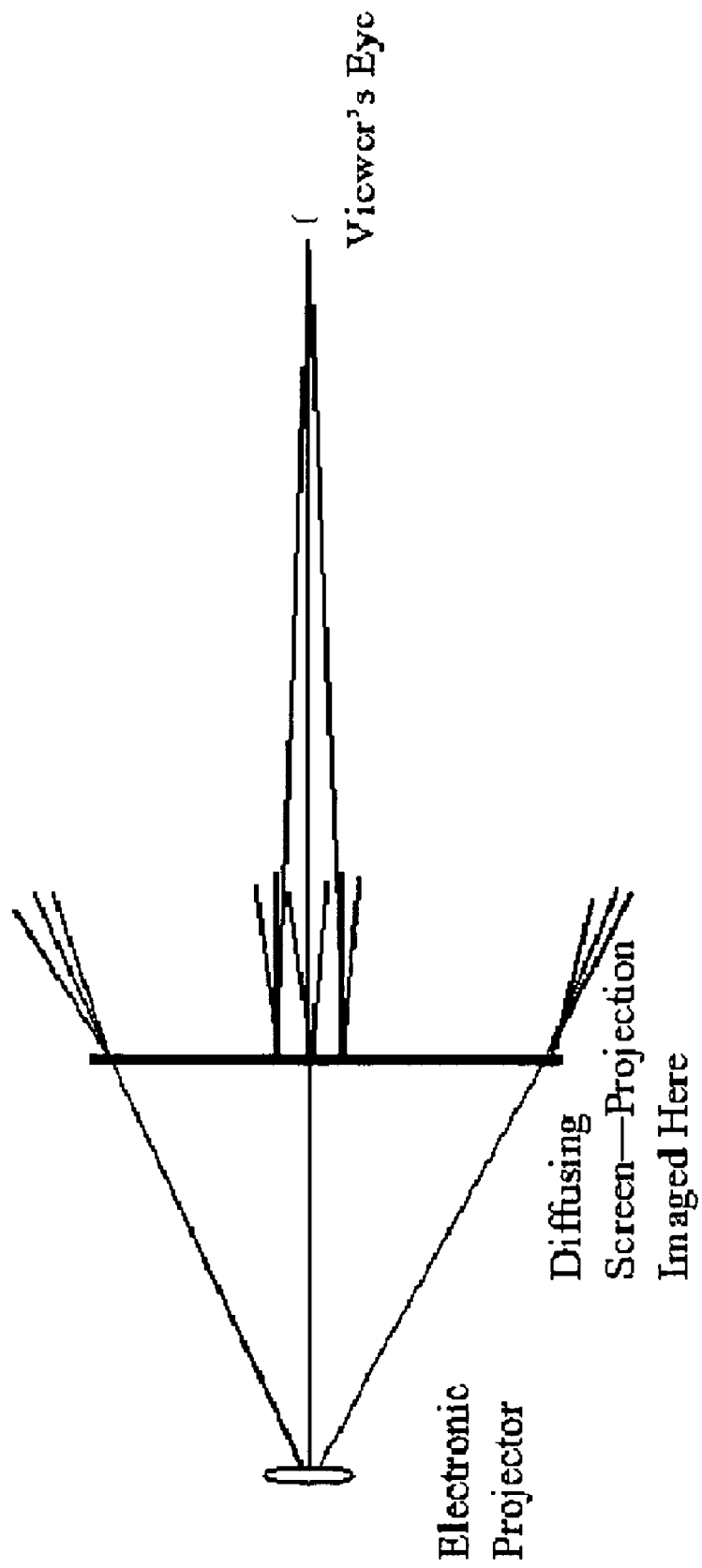
FIG. 5 illustrates what the viewer sees when a single projector fully illuminates an HOE diffusing display screen that diffuses into a very wide vertical angle and a very narrow horizontal angle. As shown schematically, light striking the screen at an angle with respect to a line from the viewer's eye to the projector only reaches the viewer's eye if the incident angle from the projector to the screen plus the angle from the screen to the viewer's eye is less than the horizontal diffusion angle of the HOE display screen. For narrow horizontal diffusion angles with wide vertical diffusion angles, the viewer sees a vertical stripe on the screen, with angular width equal to half the HOE horizontal diffusing angle, assuming that the viewer is the same distance from the screen as the projector—a typical useful viewing distance.

In particular, the new Angular Slice Display produces a 3-D display by illuminating a display screen with multiple views of a scene (each view from a different angle). Each projection completely illuminates the display screen with the view from that particular angle. For the presently preferred embodiment, the viewing/display screen diffuses the light for the projected scene over a wide angle vertically (say 60 degrees or more), but only over a very small angle horizontally (say one degree or so—smaller angles are also possible). Thus the observer sees a vertical "angular slice" projected from each angular projection, and each eye sees a different vertical angular slice from each projected scene. This is illustrated in FIG. 2. In order to fully illuminate the display screen for a viewer at one position, enough scenes must be projected on to the display screen so that there is a scene projected for every vertical angular slice projection from the viewer's eyes to the screen (each vertical slice being for instance about one degree or less). Thus for a 30-degree horizontal field of view, at least 30 scenes must be projected onto the display screen, if the viewer is to see a complete scene from a position where the display screen has a 30-degree horizontal field (assuming approximately one-degree horizontally-diffused angular slices per projection). It is worth noting one more time that each projected view fully illuminates the screen, but each individual pixel from that illumination only projects over approximately a one-degree field. Furthermore, given this system, the various projections must all be coordinated so that they all project the same scene where they overlap (where the edges of one viewed angular slice blend into the next) and must also be coordinated for intensity and viewing angle, to properly provide stereopsis. To achieve stereopsis (each eye sees a view from a slightly different angle of a particular object), the view through a particular vertical slice for each eye comes from a different projection lens. The achievement of stereopsis with the angular slice display is illustrated in FIG. 4.

The characteristics of a suitable commercial 3-D projection display, sized for use as a high-resolution computer monitor, are summarized in Table 1 below, along with the characteristics of an Engineering Prototype. All of the 2-D characteristics are taken heuristically from specifications for available high-quality 2-D monitors. The angular fields of view are not as large as those for many monitors, but few monitors are ever viewed at angles much beyond those specified. The required angular resolution is taken heuristically from the field of holographic stereograms.

TABLE 1

Typical Desirable 3-D High-Resolution Monitor Specifications

|  | Engineering Prototype | Commercial Display |
|---|---|---|
| Image Size | About 48 cm (19 inches) diagonal | 50 cm (20 inches) diagonal, or the order of 40 cm by 30 cm (or larger-given a projection technology, larger devices would not be hugely more expensive-the electronics & micro-displays would be identical for the larger display). |
| 2D Resolution (single angular slice) | 1024 × 768 | 1920 × 1080 pixels (or 1600 × 1200 pixels depending on aspect ratio-about 2 Mpixels per viewing angle) |
| Horizontal FOV | 3 to 10 degrees | 60 degrees |
| Vertical FOV | 60 degrees | 30 to 60 degrees |
| Angular Resolution | 1 degree | 0.5 to 1 degree, or less |
| Colors Displayed | Monochrome | ~32,000 to ~16 million |

Without debating what type of technology is used to produce the display, this leads to the number of pixels required for a high-resolution 3-D display. Using ~1-degree angular resolution and 30-degree vertical by 60-degree horizontal FOV the full parallax full color (three color pixels per physical pixel) display requires about 10 Gpixels per frame, or a factor of 100 less than the similar holographic display.

A horizontal parallax only (HPO) 3-D display would similarly require about 360 Mpixels for full-color at three pixels per color, or 120 Mpixels where each pixel is full-color (e.g., time-sequential color). This is a reduction of an order of magnitude from the 3 Gpixels required for the true holographic HPO full-color display, and comes much closer to the resolution requirements of the human eye at typical working distances. While not at all a trivial requirement, these numbers are within striking distance of available technology, and as will be discussed below, can potentially be achieved using, for instance, just 12 Texas Instruments DMD spatial light modulators with scanning mirrors. For a no-moving parts display, 60 of the DMD's would provide a full-color (sequential strobed color at 24 bits), HPO device with 60-degree FOV. While this may presently sound like a large number of chips, these chips have extremely long lifetimes (basically they don't fail), use relatively little power, and as the technology progresses, prices will fall to likely make the no-moving parts full-color 120 Mpixels per frame display a very attractive 3-D display alternative. Note that any high-resolution micro-display or micro-display projector can be used—the system is not limited to using the DMD devices. For instance LCD (liquid crystal display), LCOS (liquid crystal on silicon), or Ferroelectric micro-displays could also be used, as well as pixel-scanning laser illuminated devices in addition to any high-resolution micro-display suitable for image projection.

An Engineering Prototype display might be significantly different from a Commercial Prototype. First building an Engineering Prototype Angular Slice Display will allow inexpensive first use of the technology. The display will be a nominally monochrome system designed and built to cost, with a minimum of three and a maximum of ten channels (angular slices). For a Commercial Prototype, a full-color system with at least 20 channels (first commercial prototype) and then a 60-channel system would be entirely reasonable. The Angular Slice technology scales to full-color 3-D displays and also scales to larger display sizes, without the considerable wasted data density required by true holography. It leverages the technology of holography without requiring display of data that cannot be perceived by the human eye at typical user distances. The technology has the additional advantages of being usable as a front projection display for larger audiences. Beyond this, display intensity potentially scales linearly with the number of channels when a single micro-display/DMD per channel no-moving-parts system is built. The input Lumens for each channel using high-power LED's ranges from 350 Lumens (single-sided illumination) to 700 Lumens (double-sided illumination) per DMD, with a power requirement of only 15 to 30 Watts per DMD channel. As the number of angular slices approaches commercial requirements, the Lumens potentially available for input to the system exceeds 14,000 Lumens and could reach 42,000 Lumens or more for a 60-channel system (obviously this can be reduced to lower levels where this brightness is not necessary), suitable for front projection display for larger audiences.

Figure 6:
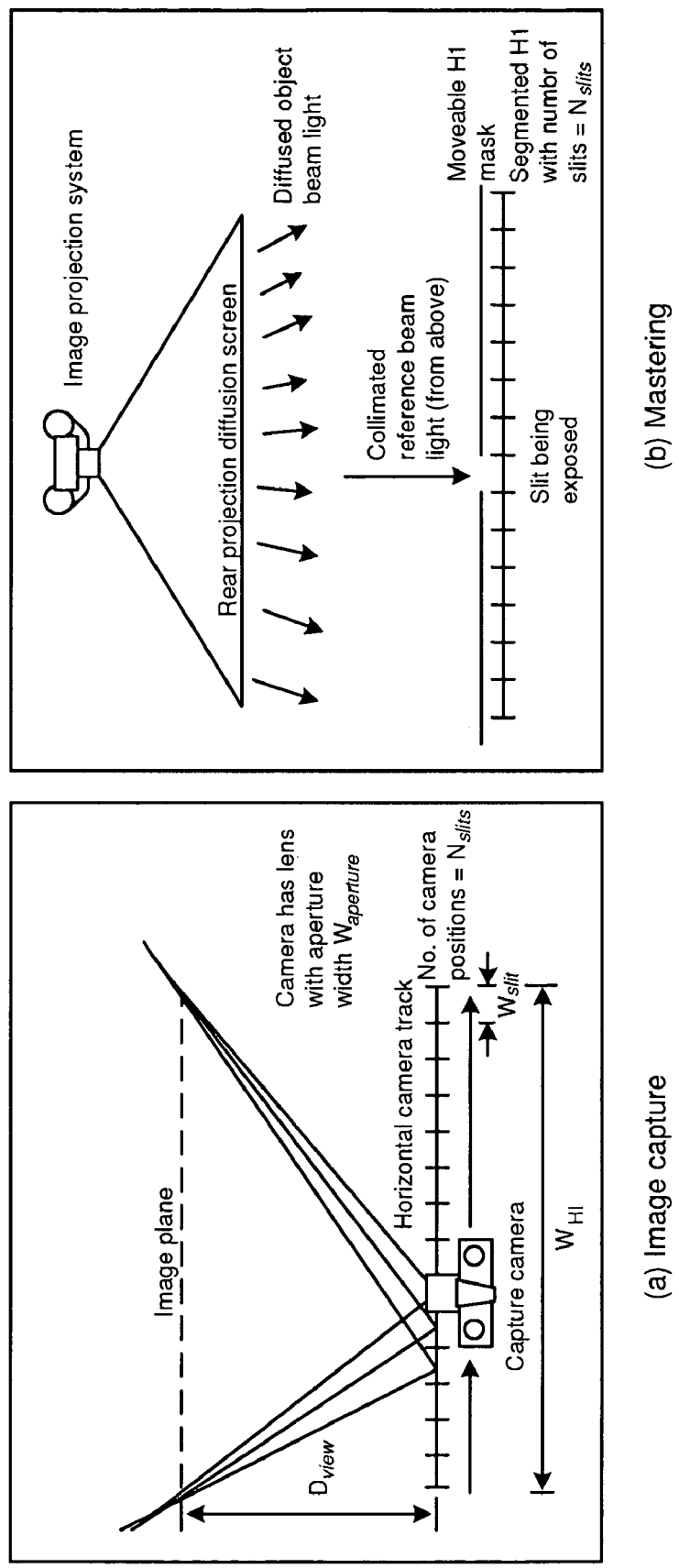
FIG. 6 shows a Prior Art Holographic Stereogram. In (a) the process of capturing N images is shown schematically. To make a simple stereogram these images are then recorded in coherent light as vertical strips on a hologram (b). More sophisticated methods record all of the images at once either directly or in a two-step method (see the references by King, Klug, and Halle), and angular multiplexing (rather than separate spatial strips) can be used.

About three decades ago the fixed display holographers began to realize that a true hologram has far more information in it than is useful for human perception, and started developing holographic stereograms[18,19,20] for fixed image white-light (illuminated with white-light point source) display. A holographic stereogram consists of N conventional two-dimensional views of a scene at different positions, where N can be the order of a hundred for HPO holographic stereograms (FOV the order of 100 degrees), or considerably more 2D views for full-parallax. Development has been semi-continuous, and in the 1990's HPO holographic stereograms were perfected[21,22,23] followed in the late 1990's by full-parallax holographic stereograms[24,25]. This technology has been improved to the point of commercialization and is capable of producing large and stunning full-color, full-parallax still images (the images cannot be changed in time—they are fixed as printed). For example, departing the luggage retrieval area of the Austin, Tex., airport there is a very large (order of 1 meter by two meters) full-color, full-parallax hologram by Zebra Imaging (www.zebraimaging.com) over the center exit to the street. FIG. 6 shows the process of capturing N two-dimensional images and then recording them with coherent light on vertical slits for a particular type of holographic stereogram.

In one sense, the invention inverts the techniques of holographic stereography, for example, by using a holographically produced LSD (Light Shaping Diffuser, Physical Optics Corporation, or similar diffusing screen) display screen and projecting N electronically produced two-dimensional images through the display plane in HPO. An Engineering Prototype could have three to ten angular slices, while the commercial prototype would have 20 (first prototype) to 60 (advanced prototype) or more angular slices. Each 2-D image will be an angular slice of the total angular field of view (about 1 degree for each angular slice), as seen by a camera at a particular location, with, for one-degree angular slices, the camera locations separated by about one degree (or the equivalent of one degree in the Angular Slice Display image space). The angular slice refers to the light falling on any particular pixel from the 2-D view. While the entire 2-D image from any single projector might project into 60 or more degrees, the light emitted from any particular pixel illuminated by the particular 2-D view would only emit into approximately a one-degree FOV horizontally (and 30 to 60 degrees vertically). Thus a particular display pixel would need to be illuminated by at least sixty 2-D images to cover a 60-degree FOV, with the projection of each 2-D image pixel striking the display screen pixel covering only one degree. The individual two-dimensional images are produced from three-dimensional data (rendered) and replayed with a Texas Instruments Digital Mirror Device (DMD), nominally one DMD (or other 2-D microdisplay device) per 2-D image for the preferred implementation. The technology is scalable to full-parallax, but for the sake of simplicity and initial cost an HPO system is the present preferred implementation.

Exemplary Embodiments

Scanning Angular Slice 3-D Display

Figure 7:
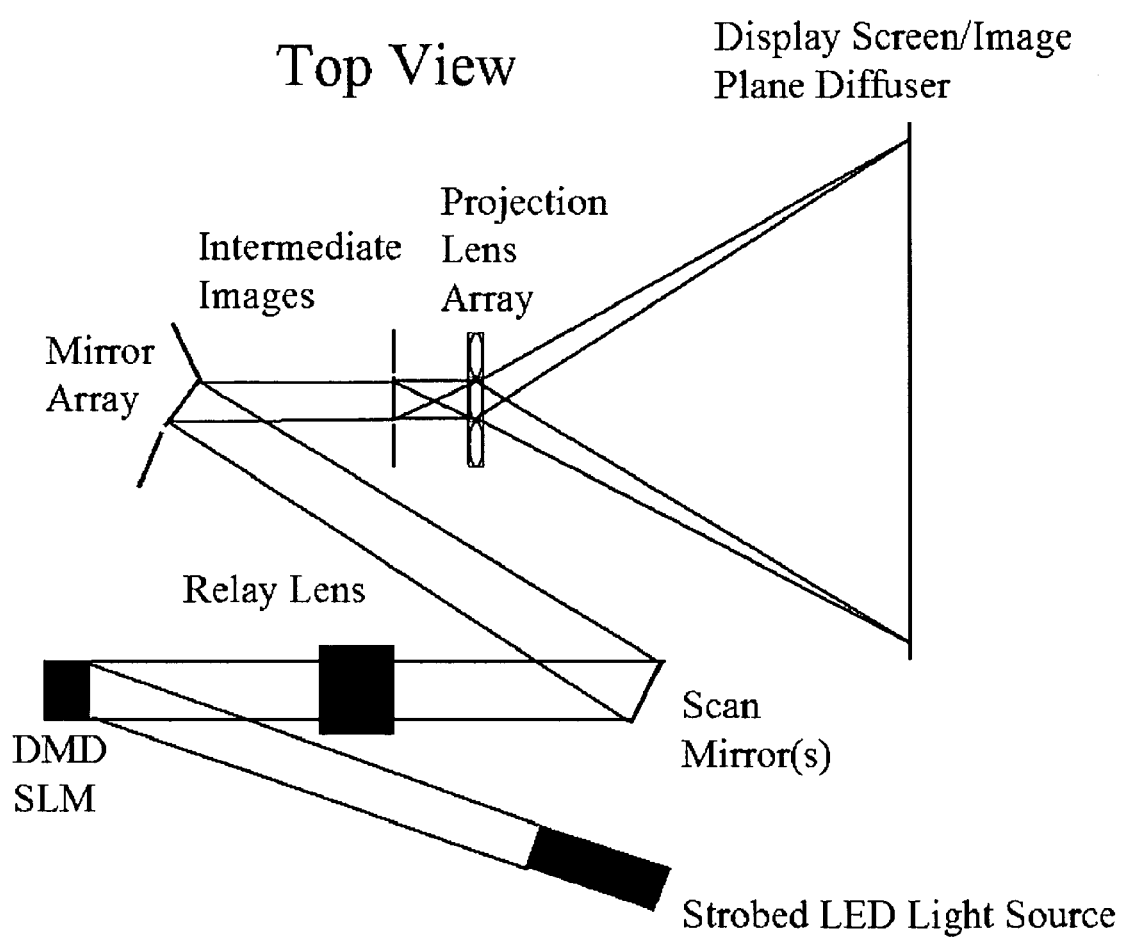
FIG. 7 illustrates a schematic for one implementation of the Angular Slice True 3-D Image Projection System. A DMD produces 2D images, which are scanned across the image plane array. Each 2D image passes through its own projection lens and illuminates the HOE/LSD display screen from a different angle. The holographically produced display screen diffuses each angular slice so that every 2D pixel illuminates a one-degree field horizontally and a 60-degree field vertically. This produces a modular 3-D display capable of any desired resolution and full-parallax if desired (but using a different HOE and more lenses).

FIG. 7 shows a schematic of a single element projection back to the image plane. Either laser light or collimated single-color incoherent light (e.g. collimated narrow-band LED illumination) strikes a Texas Instruments (TI) digital mirror device (DMD) at an angle of about 24 degrees. Note that liquid crystal on silicon (LCOS) microdisplays are another possibility for a no-moving parts design (lower frame rates required). For the scanning mirror design shown schematically, the high frame rates of the TI device are very attractive, requiring fewer devices for adequate refresh rates. Since the DMD "on" position has an angle of 12 degrees to the perpendicular to the SLM, all of the on pixels reflect the incident light perpendicular to the SLM for 24-degree incident illumination. A conventional achromatic relay lens focuses the DMD image and a scanning mirror distributes the beam to each Angular Slice view projector, which consists of a projection lens (possibly formed into a square shape for easy mounting and matching to the display).

The nominal target for a production commercial display is to have an array of 60 two-dimensional images (60 degree FOV, one degree per 2D view). The projection lens array will be scanned from both sides so that three DMD's (one for each color, combined with dichroic mirrors) update 10 to 15 projection lenses at 30 to 50 frames per second. The LSD at the display Image Plane diffuses each 2D image into a 60 degree vertical angle and the horizontal angle is provided by the multiple views with each view diffused to one degree viewing horizontally by the LSD in the horizontal plane.

Figure 8:
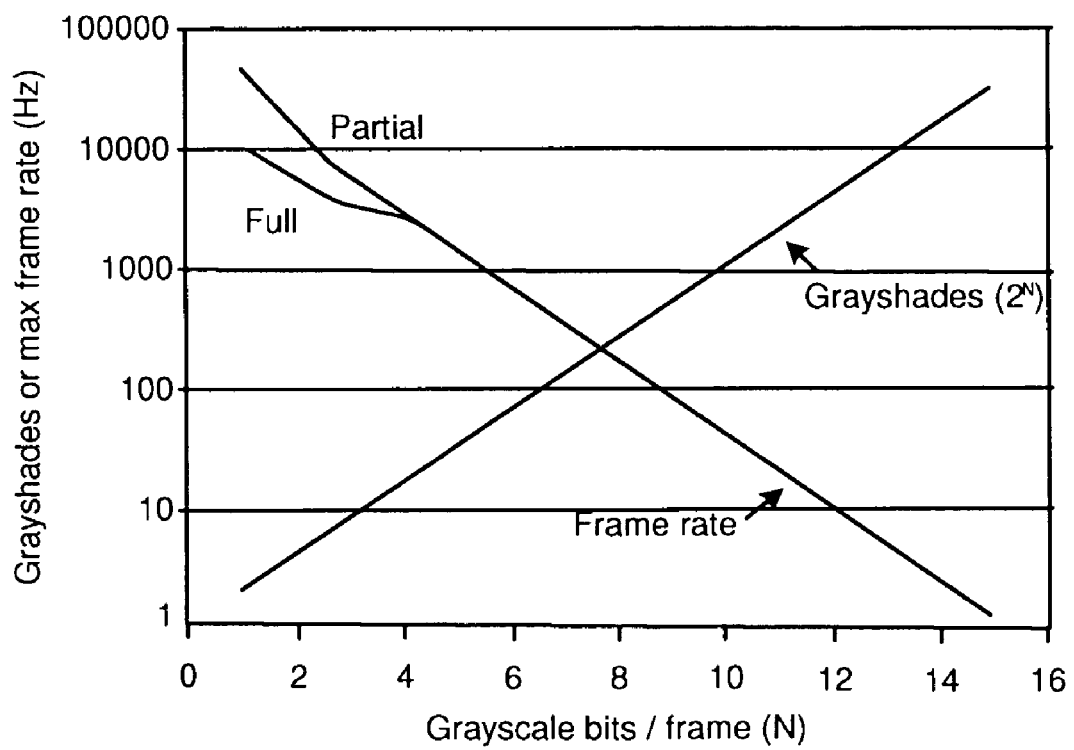
FIG. 8 shows a chart of frames per second vs. pixel bit depth for the previous generation of TI DMD devices. The newer Discovery 3000 (Fall 2005/Winter 2006) is capable of 16,300 binary frames per second.

The rate at which the DMD's can update has improved with each generation of devices, which have now been produced by TI for more than 20 years. FIG. 8 shows the update rate versus pixel bit depth for the previous generation of devices (a higher speed new generation development DMD, the Discovery 3000 with maximum 16,300 FPS, has Preview specifications available now, Fall of 2005).

Scanning Angular Slice 3-D Display Optical Design

Figure 9:
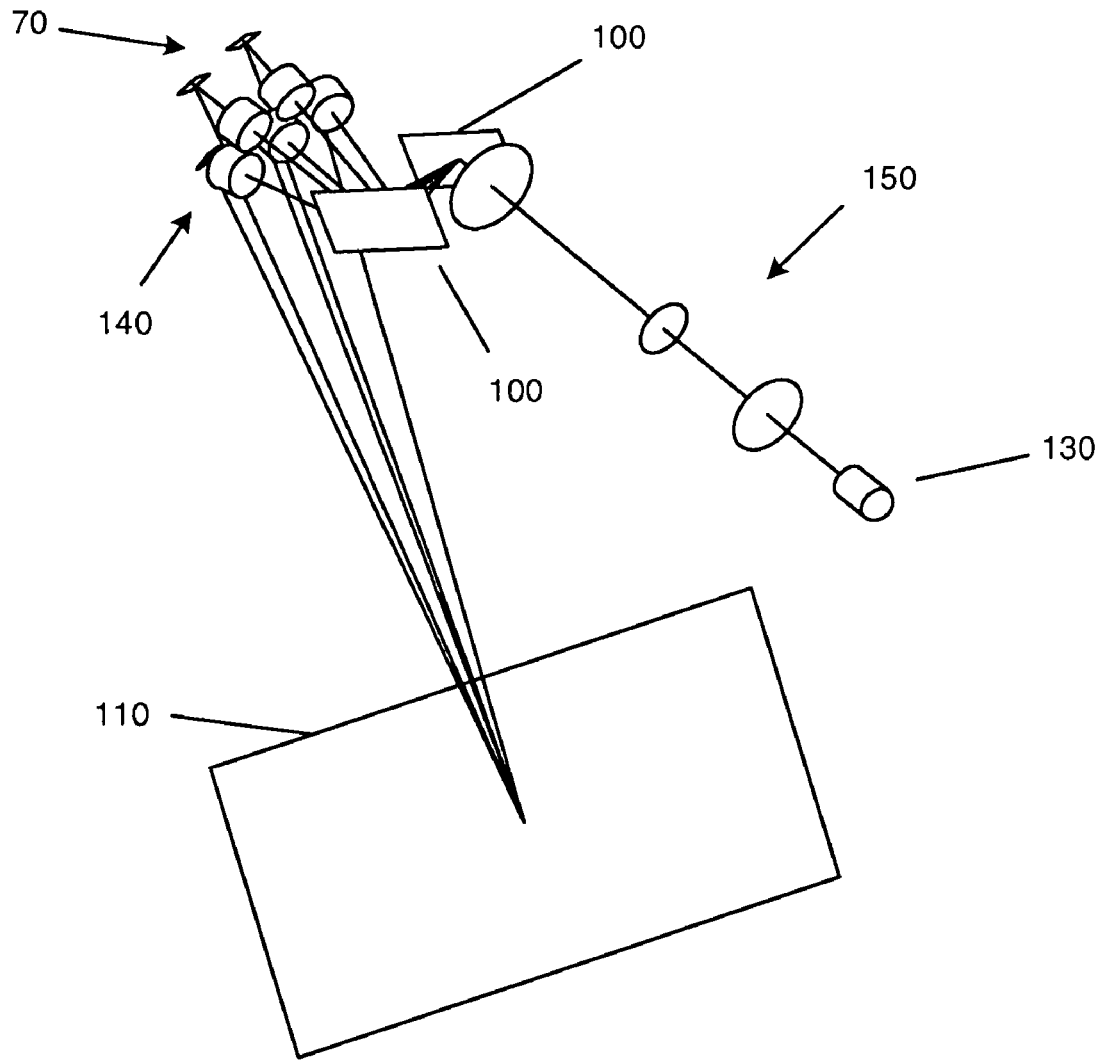
FIG. 9 depicts an example of an optical design and layout of a five-channel scanning-mirror Angular Slice Display. This layout could be doubled (two DMD devices) and used for a multi-channel Engineering Prototype with up to 10 angular slice channels separated by one degree each. The layout starts with the DMD device 130 (view of illumination suppressed), followed by relay lenses 150 to the scanning mirrors 100. Five projection lenses 140 immediately follow the dual scanning mirrors 100, with fixed-position turning mirrors 70 to direct the angular slices to the holographic diffuser (LSD) display screen 110.

FIG. 9 shows a potential optical design for an Engineering Prototype device. This design was developed in Zemax and has five angular slice channels. In order to have adequate size for the projection optics to efficiently use the strobed LED lighting (LED lighting not shown) planned for the prototype device, from the point of view of the display screen 110 the projection lenses 140 require about four-degrees of field. The planned LED illumination (not shown, Luxeon high-power LED's from Lumileds) has a ~20 mm diameter in an ~f/2.9 cone, which sets the projection lens size to make efficient use of the LED illumination. Since the design spec is to have a projection lens 140 every one-degree of angular field as seen from the display screen 110, the angular field is reduced to two degrees between projection lenses 140 by placing them into two horizontal rows. This five-channel design can then be doubled with the second set of five channels and DMD (second set of channels and DMD not shown) offset by one degree. The angular field between projection lenses 140 then achieves the desired one-degree angular field of view to the display screen 110. The vertical field of the projection lenses 140 for this four horizontal plane arrangement is about 8 degrees, slightly asymmetrizing the overall vertical angular field, but not in an important fashion. Since the display screen HOE 110 (LSD from POC) diffuses the light 60 degrees vertically, the ±4 degree asymmetry will have little effect on the display performance.

Returning to FIG. 9, the design starts at the DMD device 130 (the illumination design has been suppressed for simplicity). Relay lenses 150 carry the DMD image to the scanning mirrors 100, and an intermediate image plane is formed after the scanning mirrors in front of each of the projection lenses 140, as the DMD image is updated and scanned from one projection lens to the next. The stepping time for the scanning mirrors 100 is less than one millisecond, and the total time per image from the DMD 130 is ~4 milliseconds (5 angular slices updated at 50 frames per second, for a total of 250 FPS from the DMD 130 with 4 ms per frame). Since the LED illumination (not shown) is strobed with a risetime of ~100 nanoseconds, the illumination can be blanked during the ~1 ms mirror 100 stepping time to prevent blurring and image aliasing. After passing through its projection lens 140, each 2-D angular slice image is reflected off a mirror 70 to the HOE Display Screen 110. The mirrors 70 are required after the projection lenses 140 since the projection lenses 140 must form a divergent arc around the scanning mirrors but must also converge on the Display Screen 110. The mirror 70 following each projection lens 140 allows the 2-D images to converge from each angle to the Display Screen 110.

Figure 10:
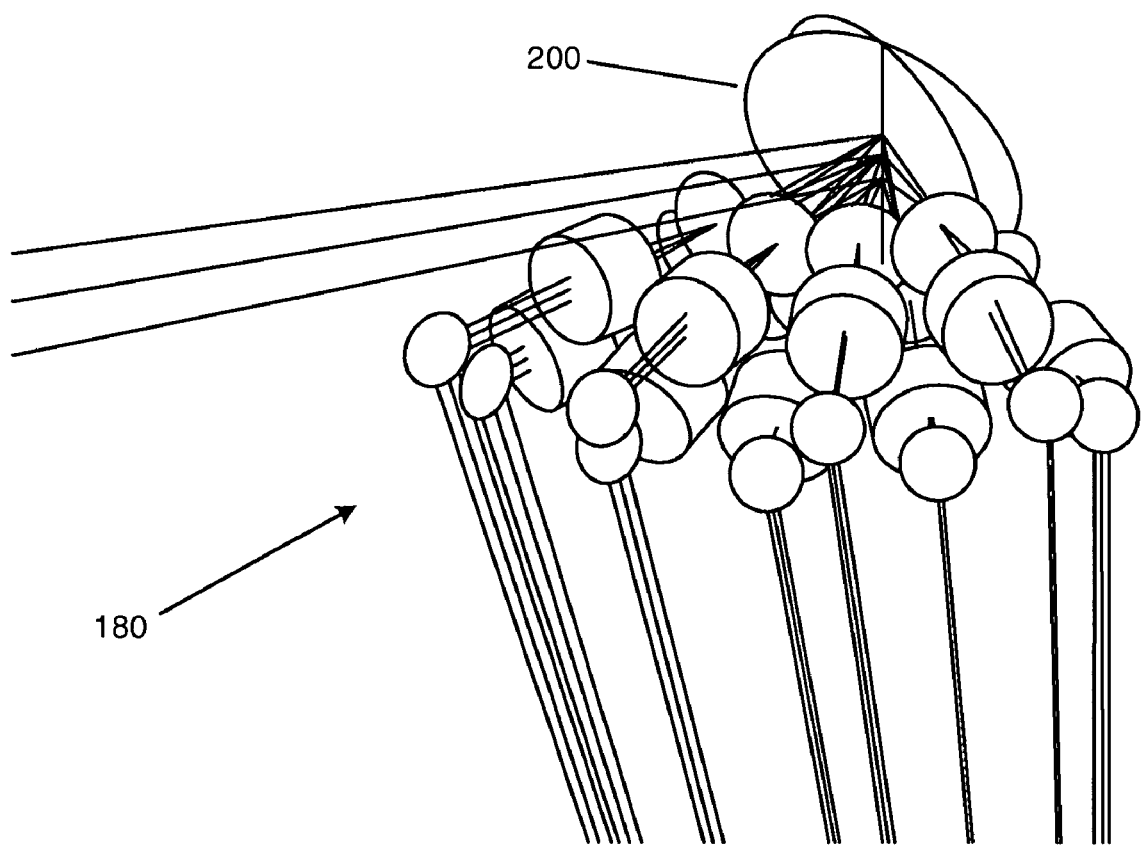
FIG. 10 illustrates an optical design layout of a potential commercial prototype Angular Slice 3-D Display system with up to ten optical (angular slice) channels 180 per DMD (DMD not shown, only 9 channels shown, 10'th channel suppressed).

FIG. 10 shows an optical design suitable for a commercial prototype. A scanning mirror 200 design implemented for 10 channels 180 is shown (only 9 channels actually shown, 10'th channel suppressed). Four of these 10-channel systems, implemented with a one-degree offset would lead to a 40-channel commercial system (40 angular slices separated by one degree, for ±20 degree viewing). The implementation would require first an up-down mirror image (not shown) of the 10-channel system, leading to 20 channels each with one degree of viewing, and then a left-right mirror image (not shown), leading to a total of 40 channels with one degree of viewing per angular slice channel.

A scanning-mirror commercial prototype as described would require three DMD devices combined via an X-cube per set of 10 angular slices (to provide three colors), for a total of 12 DMD's for 40 angular-slice channels. The refresh rate would be 30 to 50 frames per second per angular slice, for a total frame rate of 300 to 500 FPS for each DMD. The total time for each frame would be 2 to 3 ms, with a mirror move time of <1 ms. Thus the illumination time (LED strobe on time) would be 1 to 2 ms per frame. Such a commercial design would allow at least 15 bits of color (possibly up to 21 bits of color, depending on the refresh frame rate and how much less than 1 ms the mirror scan time is) for a "high-color" high-resolution 3-D display.

No Moving Parts True 3-D Angular Slice Display

Figure 11:
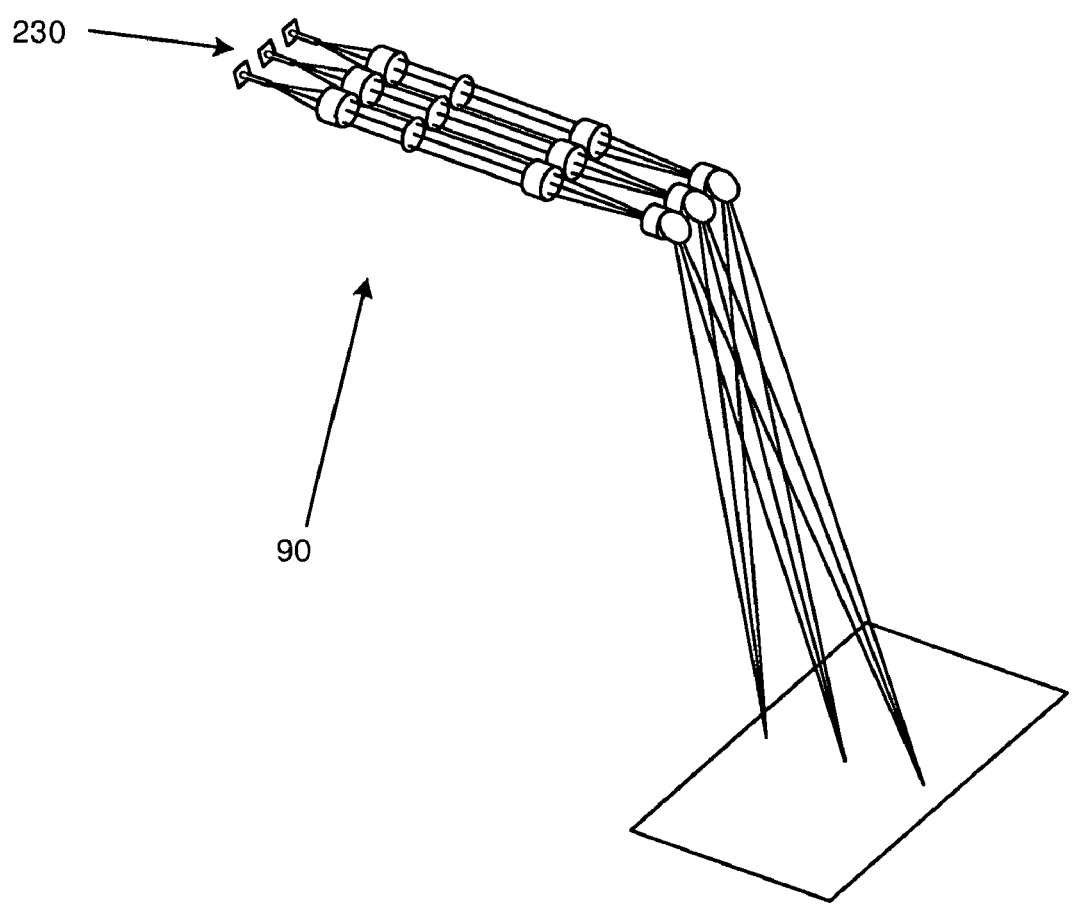
FIG. 11 is a schematically depicted optical design for a no-moving-parts design showing three-channels 90 of a potential commercial system with one DMD 230 per Angular Slice Channel. An actual commercial system would likely have 20 or more separate Angular Slice Channels.

An alternative no-moving-parts preferred embodiment commercial design uses a similar projection lens layout, but entirely eliminates the scanning mirrors and relay lenses. In this design a single micro-display is used for each of the angular slice channels (one 2-D image-producing microdisplay per channel/projection lens). FIG. 11 below shows a sample optical layout for a three-channel system 90 with one DMD 230 per optical channel. For a 40-channel commercial system, 40 DMD's would be required, and for a 60-angular-slice system, 60 DMD's would be required. While on first hearing this sounds extravagant, the fact is that electronics continue to double in speed and density every 18 months or so (and likely will continue on this course for a few more years) and simultaneously, prices continue to fall. In a few years mass-production of 60-DMD true 3-D displays may not seem extravagant at all. Color implementation for such a single-DMD per channel angular slice display is through sequential color (simultaneous color with three-DMD's combined via an X-cube would also be possible). For sequential color, each color is strobed for a complete image of that single color, and for a 60 Hz refresh rate the DMD runs at 180 FPS (three colors times 60 FPS per color). At this refresh rate the DMD is easily capable of full eight-bit modulation per color, for a true-color (24-bits or 16 Million colors) high-resolution true 3-D display. The strobing of each LED color is synchronized with the display so that no light shines on the DMD during resets, leading to very high contrast and basically zero image blurring, given the 100 nanosecond rise and fall time of the LED's. Note that neither DMD's nor LED illumination are intrinsic to the invention or the design. Any suitable microdisplay (LCOS, LCD, Ferroelectric, laser scanning, other) and any suitable illumination source (UHP lamp, Xenon lamp, laser sources, other) could be used to produce the True 3-D Angular Slice Display system.

Angular Slice True 3-D Display Illumination System Design

Strobed high-power LED illumination has been chosen as the preferred alternative light source for the Angular Slice True 3-D Display, although many other light sources would also work. The high-power LED's presently chosen are the Luxeon series from Lumileds, specifically the Luxeon III device for the red LED, and the Luxeon V devices for the Green and Blue LED's, although again these can be easily replaced by other LED sources or other light sources.

Illumination is usually introduced off-axis for the DMD devices, since the micro-mirrors are slanted at an angle to the surface perpendicular in the "on" condition. For the proposed Discovery 1100 DMD the "on-state" angle is 12 degrees, so the illumination is introduced at 24 degrees from the perpendicular, and light reflected from the "on" pixels leaves perpendicular to the DMD surface. By inverting the image (changing "off" pixels to "on" and vice-versa) the DMD can actually be illuminated from both sides on alternating frames. Using strobed LED's this allows the actual power incident on the DMD to be doubled. Every other frame is illuminated from the alternate side, and the LED's are strobed at double the power with a 50% duty cycle. Discussions with TI have validated the concept of illuminating from the "off" side. Some care must be taken in the design to eliminate any light bands around the edges (the image must be apertured at an intermediate image location). Note that the light from "off" pixels is reflected at 48 degrees (since they are at a 24-degree angle with respect to the "on" pixels) and goes into a beam dump on either side for double-sided illumination.

Pulsed (strobed) LED sources can be operated at higher currents than CW sources and are more compatible with multiplexed displays for the angular slice display system. Rise-time for the light from the Luxeon LED's is less than 100 nanoseconds. For instance the author has supervised testing of the Lumileds high-power LED's, which are rated for 700 mA current CW, at 20 Amps for 20 microseconds, so far at pulse repetition frequencies up to 60 Hz though much higher should be possible. Pulse length required for a display would be a function of the particular micro-display device operating principle and frame rate. For the TI DMD devices, anticipated pulse lengths are the order of 1 to 4 milliseconds, with a duty cycle of 25% to up to 50% for dual-sided illumination with the no moving parts display design. The pulsed current would be regulated so that the net power from the LED is equal to or less than the CW power rating. Present information shows that temperature is the cause of failure for over-driven LED sources. Typically thermal expansion due to heating from the LED drive current causes the electrical leads to the bond pads to break. Maintaining the substrate temperature at a level below the CW rated temperature will be critical to the strobed LED solution, and active cooling will nominally be included (e.g., thermoelectric cooling) to maintain the LED below the rated temperature even during the strobe pulse. Lumileds is now producing the Luxeon K2 LED emitter in red with allowable CW drive currents up to 1,400 mA, double the previous 700 mA. Besides the Lumileds high-power LED's, Osram is also producing a competitive line of high-power LED's (Golden Dragon). The Osram line appears to be about one generation behind Lumileds, but nevertheless offers another high-power alternative. Table 2 and Table 3 show the typical luminous flux available from the RGB LED's. For the red Luxeon III about 140 Lumens is typically available, for the green Luxeon V about 160 Lumens, and for the blue Luxeon V about 48 Lumens, for a total of ~350 Lumens for an RGB combination (dichroically combined using an X-cube).

TABLE 2

Lumileds Luxeon III Star Luminous Flux at 1,400 mA

| Color | Luxeon Emitter | Minimum Luminous Flux (lm) $\Phi_r^{[1,2]}$ | Typical Luminous Flux (lm) $\Phi_r^{[2]}$ | Radiation Pattern |
|---|---|---|---|---|
| Red | LXHL-LD3C | 90 | 140 | |
| Red-Orange | LXHL-LH3C | 120 | 190 | Lambertian |
| Amber | LXHL-LL3C | 70 | 110 | |

TABLE 3

Lumileds Luxeon V Star Luminous Flux at 700 mA

| COLOR | PART NUMBER | MINIMUM LUMINOUS FLUX (lm) OR RADIOMETRIC POWER (MW) $\Phi_\nu{}^{[1,2]}$ | TYPICAL LUMINOUS FLUX (lm) OR RADIOMETRIC POWER (MW) $\Phi_\nu{}^{[2]}$ | RADIATION PATTERN |
|---|---|---|---|---|
| GREEN | LXHL-LM5C | 67.2 | 160 | |
| CYAN | LXHL-LE5C | 67.2 | 160 | LAMBERTIAN |
| BLUE[3] | LXHL-LB5C | 23.5 | 48 | |
| ROYAL BLUE[4] | LXHL-LR5C | 275 MW | 700 MW | |

A preliminary illumination design using a light pipe and relay lens combination produces an illumination efficiency at the TI DMD of about 70% (this will of course decrease further as it progresses through the balance of the optics, however this is with the TI DMD optics f/# already matched to the f/# of the balance of the system). The present illumination design uses 6 of the Luxeon LED's per TI DMD light engine so that each light engine is illuminated with ~700 Lumens (at the estimated 70% efficiency this drops to 500 Lumens per light engine). For the Engineering Prototype with two light engines/DMD's the total available light is about 1400 Lumens. It should be possible to have 500 or more actual usable Lumens through the Display Screen (as opposed to advertised Lumens), which will result in adequate illumination for viewing. A dual-sided illumination design with strobed illumination (maintaining the rated Luxeon average power) makes an attractive illumination design, requiring about 60 Watts of power and resulting in an estimated 500 Lumens or more of light out of the display (1400 Lumens actually available at the illumination source), for double-sided illumination of two DMD's.

For the Engineering Prototype Display, the illumination will be "monochrome", that is, the RGB LED illumination will be dichroically combined with an X-cube, and all colors will strike the DMD device simultaneously, so that modulation will be gray-scale modulation of the color formed by the direct sum of the RGB LED's.

For the commercial prototype design, strobed high-power LED illumination is also the planned preferred alternative for illumination. Two preferred alternative variations of the Angular Slice Display are under consideration for the commercial prototype. One present design is the scanning-mirror display, with three DMD's (one for each color) driving ten angular slices (projection lenses) via two galvanometer-scanned mirrors. For 40 angular slices (40 degrees of horizontal parallax, one degree per 2D angular slice) four of the 10-channel systems would be incorporated into the display. Given 700 Lumens of strobed LED illumination per 10-channel device (as discussed for the Engineering Prototype above), the total available Lumens for the 40-channel system would be approximately 2800 Lumens, which should make quite a bright display. Each color of LED would now illuminate only its individual DMD, with the images from the DMD's now being combined by the dichroic X-cube. For a refresh rate of 30 to 50 FPS per angular channel, the total frame rate for each DMD would be 300 to 500 FPS. Given a mirror scan time per frame of about 1 ms, then the LED strobe on time would be 1 to 2 ms per frame. Illuminating every other frame from the alternate side (double-sided illumination of the DMD), the duty cycle would be between 25% and 33% with the strobed current to the LED pulsed commensurately higher.

The alternative preferred design (and the most preferred design) is a no-moving-parts system with one micro-display/DMD per angular slice channel (one DMD per projection lens). In this Angular Slice Display the illumination would remain high-power strobed LED's, but now the color would be by sequential illumination of the DMD rather than dichroically combining the color images from three DMD's. This is possible because of the reduced frame rate when one micro-display/DMD is used for every angular slice projected. With such a system a refresh rate of 60 FPS for each color would require an overall DMD frame rate of only 180 FPS, as opposed to the 300 to 500 FPS required for the scanning mirror system discussed above. Separate red, green, and blue images would be projected sequentially. In this case three LED's (red, green, blue) would illuminate each DMD through an X-cube dichroic combiner. The red image would be loaded into the DMD and the red LED would be strobed, then the blue image loaded and the blue LED strobed, and etc. Duty cycle for the LED's would be around 33%, and no LED would be strobing during the resets between each image. This would make approximately 350 Lumens available per angular slice channel (using the high-power Luxeon LED's). For a 40-channel, forty-DMD system this would potentially make 14,000 Lumens available with single-sided strobed LED illumination. As the number of channels increases for a no-moving parts system, the light power available increases linearly. A 60-channel system with double-sided LED illumination would potentially have 42,000 Lumens available. In this case lower-powered LED's could be used with potentially smaller optics (since the LED size also tends to decrease as the power decreases). Alternatively, this makes enough light to fill a large room or auditorium, and the Angular Slice 3-D Display could be used as a projection display for medium sized to even very large audiences.

Angular Slice True 3-D Display Screen

A "light shaping diffuser" material from Luminit/POC has been identified as the nominal choice for the Display Screen HOE (holographic optical element) for the Angular Slice rear-projection system. This is a holographically etched high-efficiency diffuser material, which diffuses into designed angles with light utilization efficiencies the order of 92%. Off-the-shelf diffusers are available with diffusing angles from 0.5 degrees up to 80 degrees. This material has been available for several years and is generally used for shaping illumination for machine vision or architectural applications (directionally asymmetric lighting). Backup manufacturers for diffusers include HOE's from for instance Wasatch Photonics, a commercial manufacturer of HOE's. Another company with a competing holographic diffuser material is Wavefront Technology, Inc., with its TMD (tailored micro-diffuser) material, which has similar specifications to the POC material. Any material with suitable asymmetric diffusing characteristics could be used for the Display Screen, it does not necessarily have to be an HOE, although this is presently the device of choice for the diffuser screen.

Figure 12:
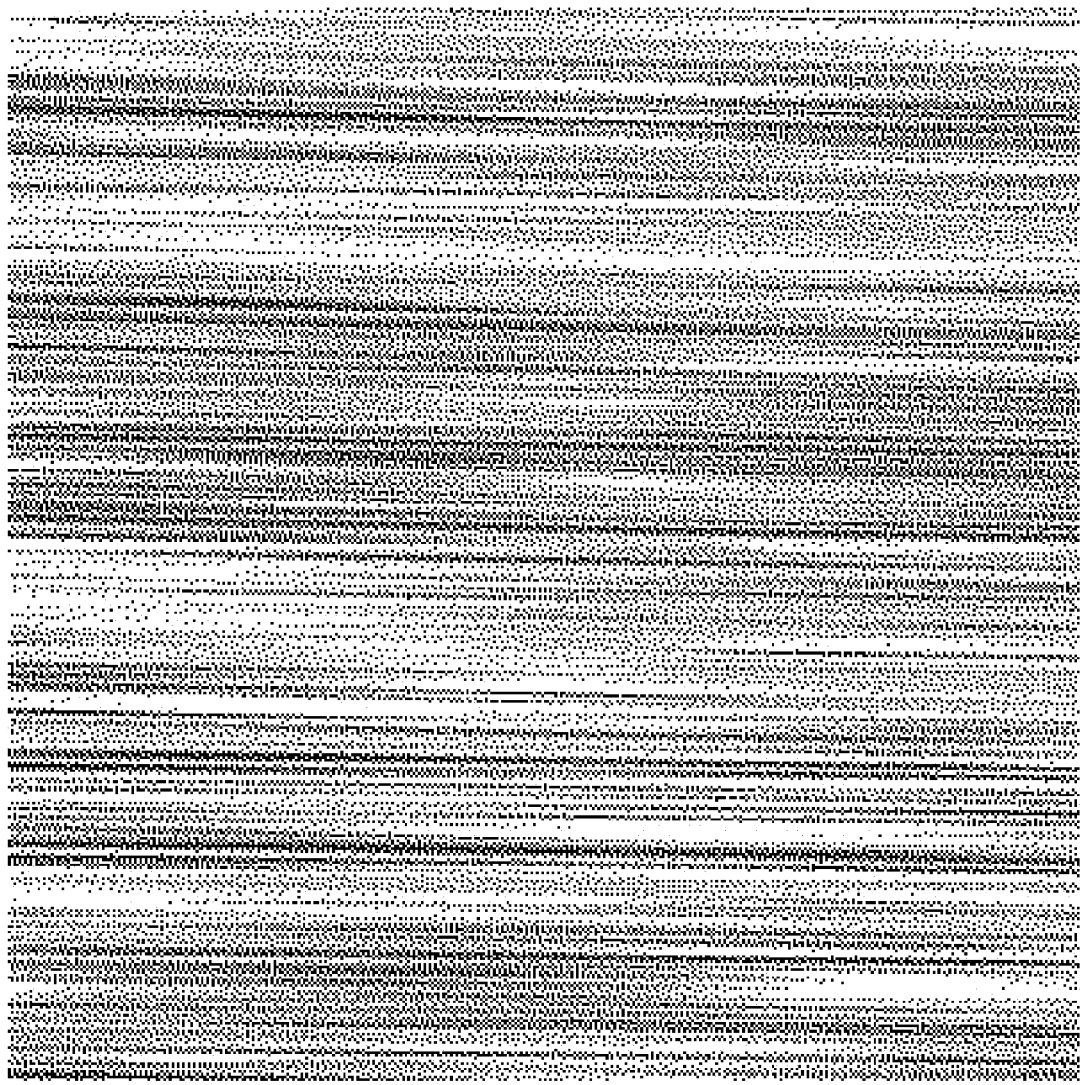
FIG. 12 shows a scanning electron microscope photomicrograph (1500×) of 0.2-degree by 40-degree LSD material from Luminit/Physical Optics Corp. The material is approximately 92% transmissive. Image courtesy POC web site.

Optical design work performed to date uses the Luminit/Physical Optics Corporation (POC) light-shaping diffuser (LSD) in the viewing plane, although other asymmetric diffuser materials could serve equally well. The LSD material can be provided with a 2-degree (FWHM) horizontal by 60-degree vertical (FWHM) diffusion zone. This material appears to be suitable for establishing the 1-degree angular slice viewing zones (projector separation angle relative to screen, equal viewer and projector distances from the display/diffusing screen) presently planned. FIG. 12 shows the microstructure for a sample of one of these holographically encoded diffusers designed to have a 0.5-degree diffusing angle in one dimension and a 40-degree diffusing angle in the other dimension. Note that the total diffusion angle, by Luminit/POC's technical specifications, adds as the root-mean-square (RMS), so that the total diffusion angle for a 0.5-degree FWHM pixel from the TI DMD after passing through a POC one-degree horizontal LSD would be about 1.1 degrees FWHM.

Some features of the Light Shaping Diffuser material:
LSD surface relief holograms are replicated from a holographically recorded master.
The completely random, non-periodic structures can be thought of as randomized micro lenslets.
LSDs are non-wavelength dependent and will work in white, monochromatic, coherent or incoherent light.
LSDs diverge light, emulating a negative lens.
LSDs work best in collimated light but will work well in non-collimated light.
The randomized structures eliminate Moiré and color diffraction.
Incoming light is precisely controlled within well-defined areas. Light does not escape these boundaries for greater control and utilization of light, thus maximizing photon utilization.

With full illumination, light leaving from the TI DMD has a ±12-degree cone (approximately f/2.4). After magnification through the system and projection lens (about a factor of 36 magnification to fill a 20" display screen) the light leaving each pixel naturally forms a ±0.33-degree cone, not too far from what is desired in the horizontal plane, but far, far less than what is desired in the vertical plane, where each pixel must provide its own illumination through a ~60-degree angle. The LSD (or alternatively TMD/other) material resolves this problem by providing very limited light diffusion in one plane, and very large light diffusion in the other plane, so that each pixel becomes visible over about one degree in the horizontal plane, but over the order of 60 degrees in the vertical plane.

HPO Angular Relationships

There are angular relations involved, which must be carefully differentiated. There is the angle that the projectors make with one another relative to the center of the display/diffusion screen, there is the angle that the vertical stripes on the screen make with one another with respect to the viewer (for the HPO implementation), and there is the angle that the projectors make with one another relative to the position of the viewer. Finally there is the fixed horizontal diffusion angle associated with a particular display screen (again for HPO).

For equal viewer and projector distances to the screen, the angle between projectors with respect to the viewer must be one-fourth of the screen horizontal diffusion angle (FWHM) in order to theoretically blend the vertical stripes correctly, and the angle between projectors with respect to the center of the screen must be one-half the screen horizontal diffusion angle (FWHM). Once correctly established, these angular relationships will keep the stripes well blended for all usable viewer positions (positions where the viewer sees any significant portion of the field-of-view).

Front Projection Display

Basically all of the present design work has been aimed at a rear-projection display, for use by one to several people as a computer monitor or similar function. However, by its very nature the Angular Slice Display is not limited to Rear Projection. All that is required to use it as a front projection display is a diffusive screen that is reflective rather than transmissive. This can be accomplished in at least two different fashions. The first way to make a selectively diffusive reflecting screen is to put a reflecting layer behind the LSD or TMD diffuser (e.g., a metal film or broadband dielectric reflecting layer behind the diffuser). The second method is to manufacture the asymmetrically diffusive screen directly from a metal or other reflecting layer. Both types of screens are available commercially directly from Luminit/POC, for instance.

Holographic Lensless (Virtual Lens) Projection Lens

Since the proposed digital microdisplays effectively have the capability of displaying diffraction gratings (arrays of dark and bright lines), and since a hologram is just a complicated diffraction grating, it is entirely conceivable to use the microdisplay to display each 2-D image on the microdisplay as a hologram, so that projection of the image to the diffusive display screen does not require a physical projection lens. Note that holographically projecting a 2-D image, or a 3-D image with very limited angular viewing (say one degree up to a few degrees) is much easier than projecting a true 3-D image of any significant angular extent (which is very difficult and essentially beyond the present state of electronic digital holography for replaying holograms with significant angular and spatial extent, say angular extents beyond about 5 degrees with spatial extents of more than 10 cm). This is because only a slight angle between the incident beam and the holographically projected image is required for projecting the 2-D image, so that unreasonably small pixels are not required and the hologram can be projected with conventional microdisplay pixel sizes (the order of 5 micron or so to 25 micron or so pixel sizes). In order to make this physically possible, some modifications to classical holography must be made:

The holograms must be designed so that the interference/diffraction (hologram) fringes are no closer physically than the pixel spacing of the microdisplay will allow (at least two pixels are required across a fringe). In order to do this, a reference wave must be used that closely matches the wavefront desired for the virtual projection lens—the reference wave (which will also be the illumination wavefront from the illumination source for actual display) must be designed so that it is only just enough different from the "virtual projection lens wavefront" (wavefront to be projected to the diffusive display screen) to produce the heterodyne carrier frequency fringes in the 2-D hologram. In general, if the projected wavefront is to be spherical this means that the reference beam must be spherical or close to spherical, so that it closely matches the desired 2-D projected wavefront. For other object beam wavefront shapes the reference beam must be similarly matched. Note that for digital holographic display, no actual reference beam is required to form the hologram—the reference beam is just a mathematical construct used to determine how to form the hologram digitally on the DMD.

The hologram (object) to display on the microdisplay must be calculated (not formed by a reference and object wave). The calculated hologram will be created by assuming that a given 2-D image (or video stream of 2-D images) is to be projected in focus at the design image plane (diffusive display screen or simply the design image plane if a diffuser is not used) and is illuminated by a wave of specified form at the design image plane from an illumination source. Then by calculating the wavefront changes back to the plane of the microdisplay, starting at the design image plane, the object wavefront at the microdisplay can be calculated. Similarly, the wavefront of the reference beam is calculated at the plane of the microdisplay, and is designed so that it matches the condition in 1 above.

Given the object beam at the microdisplay plane and the reference beam at the microdisplay plane, the hologram (diffraction grating) to be displayed by the microdisplay is calculated by summing the calculated electric fields from the object wave and the reference beam wave, and taking their square in the complex conjugate sense, to calculate a real diffraction grating. Note that the autocorrelation terms from this calculated diffraction grating (square of the reference electric field and square of the object electric field) can be dropped, retaining only the two cross-terms (hologram terms) in the calculation of the diffraction/interference grating to be displayed.

Illuminating the microdisplay hologram with a reference beam (or "conjugate reference beam") that closely matches the virtual reference beam used to calculate the hologram will result in replay of the hologram, with the desired object wave projected substantially in focus at the design image plane.

The light diffracted into the desired hologram can be enhanced by arranging the angle that the replay reference beam strikes the microdisplay at so that the hologram diffraction grating is effectively a "blaze grating" (arrange the system so that the specular angle of reflection of the reference beam matches the diffraction angle). Further, if the replay beam is a converging wave, and/or if the system is organized so that the desired object beam to be in focus at the design image plane starts as a substantially converging wave, then a spatial filter can be used at the plane where the replay beam comes closest to forming a point to remove the zero order replay beam from the system, and also to substantially filter out the complex conjugate (diverging spherical wave) of the object beam. Alternatively one can allow use of the diverging object wave and spatial filtering (at best focus) of the converging object wave from the hologram replay. For a high-efficiency blaze-grating design with the reference beam closely matched to the object beam, spatial filtering may not be required at all.

By performing lensless replay for red, green and blue images (or other sequence of colors that can substantially form white) either in a time sequential fashion or by using three sub-microdisplays and combining them dichroically, full color 2-D images from each microdisplay are formed at the design image plane, so that each eye of the viewer sees a different image that changes as the viewer changes position, thereby forming a true 3-D image for the viewer, without the benefit of projection lenses.

In addition to perfectly lensless media (no projection lens at all) the above technique can be used to remove the aberrations from a simple and inexpensive lens. The wave front is followed through the inexpensive lens so that when replayed and passing through the inexpensive lens, all of the aberrations from the inexpensive lens have been accounted for in the replay, and the image arrives substantially perfectly formed and in focus at the design image plane.

Mechanical Layout & Opto-Mechanical Design

The task of the opto-mechanical designer is to package all of the components so that they fit into a reasonable space, have good thermal management, stay aligned, and move reliably and as required. In particular thermal management and stability are important, and the placement and mounting design for the galvanometer mirror scanners are issues for the scanning-mirror version of the Angular Slice Display. For the no-moving parts implementation, mechanical and thermal stability and heat-removal become the major issues. A survey of scanning mirror implementations by various manufacturers has been conducted and scanners from nine different manufacturers have been investigated. Table 4 below shows some sample specifications from a particular manufacturer. For this particular scanner the step response time is 650 microseconds, the repeatability is 2 microradians, and the thermal drift is approximately 9 microradians per degree C. These are all suitable performance specifications for the scanning-mirror version of the Angular Slice Display. In particular note that for a 75 cm path length (fairly long) from the scanning mirror to the display viewing screen, a 30 degree temperature excursion would cause a zero drift of about 270 microradians, or less than one pixel drift of the zero location. Also note that the repeatability specification is about 2 microradians, or much less than 1% of a pixel, so the expected jitter would be less than the human eye can resolve (around 2 microns—at typical arms length a good eye might resolve ~10 microns). The electronic jitter on ordinary cable television (not HD or digital) is typically the order of one pixel (although jitter on a typical computer monitor is by contrast far, far less than a pixel).

TABLE 4

Some sample specifications for a galvanometer mirror scanner. This particular scanner is the Quantum Scan-30 from Nutfield Technologies.

| SPECIFICATION | UNITS | PERFORMANCE |
|---|---|---|
| Excursion | Degrees Optical | +/−48 |
| Rotor Inertia | Gram · Centimeters$^2$ | 5.1 |
| Recommended Beam Apertures | Millimeters | 20-50 |
| Small Step Response (5.8 gm · cm$^2$ load) | Microseconds | (Matched Inertia Load) 650 |
| Torque Constant | Dyne · cm/Amp | 2.8 * 10$^5$ |
| Coil Inductance | Micro Henrys | (at 1000 Hz) 450 |
| Coil Resistance | Ohms | 5.8 |
| Angular Sensitivity | Micro Amps/Degree | 100 |
| Repeatability | Micro Radians | 2 |
| Linearity | Percent, Minimum | 99.9 |
| Zero Drift | μrad./degree C., Max | 9 |
| Gain Drift | ppm/degree C., Max | 30 |

Figure 13:
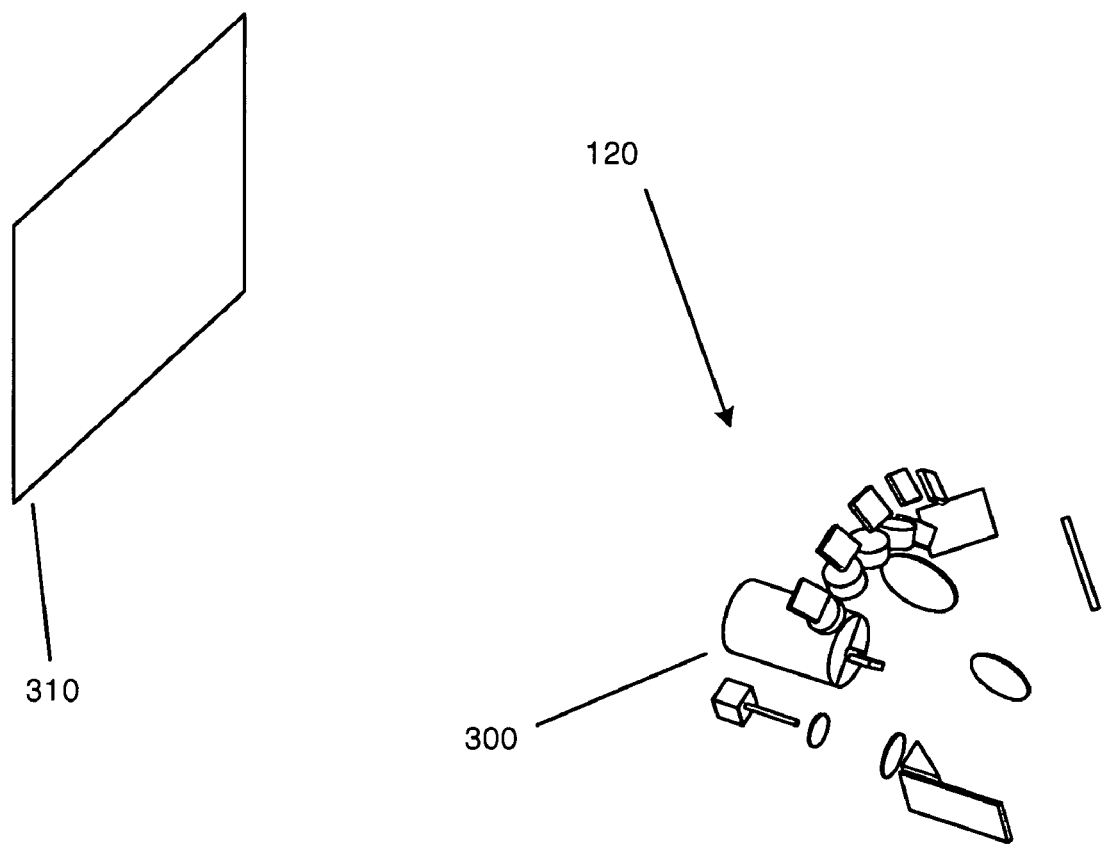
FIG. 13 displays a mechanical layout to scale of half of a sample 10-channel Engineering Prototype Angular Slice Display with scanning mirrors 300. The display screen 310 is a nominal 19" on the diagonal. All elements are shown to scale in this 3-D CAD layout. A vertical mirror image (not shown) of the optics shown 120, shifted by one degree, turns this into a 10-channel system.

FIG. 13 shows a sample opto-mechanical layout for half of a ten-channel Engineering Prototype Angular Slice Display. All of the components are shown to actual scale size, and for reference the display screen 310 has a 19" diagonal. This figure was produced in a 3-D engineering CAD program.

Figure 14:
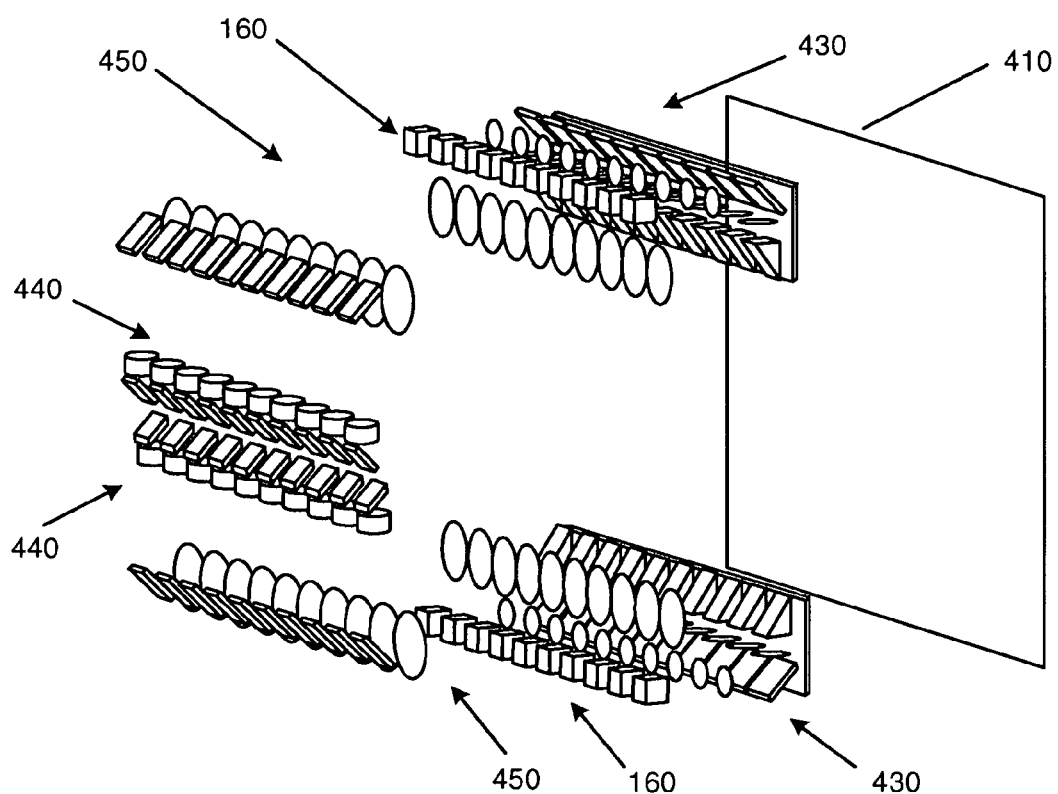
FIG. 14 provides a sample mechanical layout to scale of a 20-channel no-moving-parts Commercial Prototype Angular Slice Display with one DMD 430 per Angular Slice (per projection lens 440). This was done without trying to simplify the relay lens layout 450 from the DMD's 430 to the projection lenses 440. With high probability, all or most of the relay lenses 450 can be removed. All elements are shown to scale in this 3-D CAD layout.

FIG. 14 shows a sample engineering layout for a 20-channel commercial prototype with one DMD 430 per channel. With extremely high probability, most or all of the relay lenses 450 shown in this sample system layout can be removed to make a very compact commercial prototype. While the one-DMD per Angular Slice system requires a lot of display chips/DMD's 430, it has the very large advantage of no moving parts and greatly simplified optics. Texas Instruments is now delivering a 1920×1080 pixel high-resolution DMD device. Using 20 of these in a commercial prototype would result in a 3-D display with 120 Mpixels (for three-color time-sequential, 40 Mpixels monochrome) per frame, holding out the promise of spectacular 3-D resolution. For single-sided high-power LED illumination 160, 6000 Lumens would be available at the LED sources 160, which should result in at least 3000 Lumens out of the display screen 410.

Angular Slice Spatial Resolution & Depth of Focus

The spatial resolution of the Angular Slice Display at the diffusion screen is equal to the full resolution of whatever projectors are being used for image creation, i.e., if the projectors have 1920×1080 resolution then the display resolution at the display screen and in the near vicinity of the screen will have 1920×1080 spatial resolution.

As objects are moved away from the screen in the z-dimension (perpendicular to the screen) the object resolution must not be higher than the Angular Slice resolution, in order to prevent aliasing artifacts (high spatial frequencies masquerading as low frequencies) in the image. This basically means that the object resolution must have a depth of focus with respect to the display screen. For instance, with one degree Angular Slice resolution (projectors with respect to the center of the screen) an object 2 cm from the screen cannot have a spatial resolution greater than 350 microns [=sin(1-deg)× 0.02 m].

Algorithms for providing the required depth of focus on the 3D dataset or other 3D data with known z-distance are well-known in the literature. Similarly for multiple cameras, cameras with suitable depth of focus can be matched to the display.

Algorithms & Software

Figure 15:
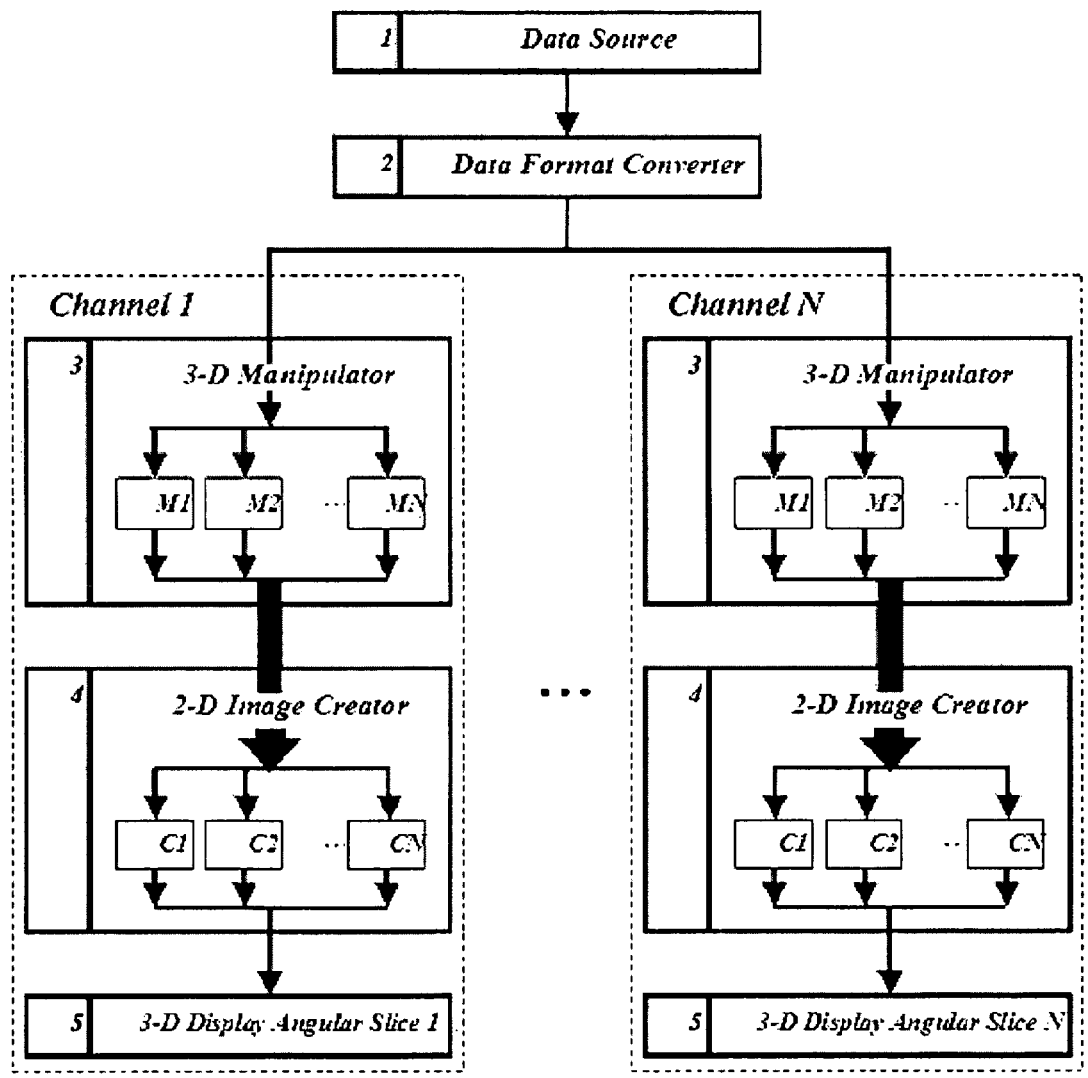
FIG. 15 gives a flow chart for 2-D image creation. In 3-D space homogeneous (four-dimensional) coordinates are used to linearize all the dataset manipulation. Given a 3-D dataset formatted as desired, OpenGL or Direct X can be used for rendering each of the 2-D Angular Slices. Other rendering software could also be used.

For 3-D image manipulation "homogeneous" coordinates are used. The choice of this coordinate system (which adds a fourth coordinate, rho (□) to the 3-D dataset) linearizes all the 3-D data transformations; so that linear algebra can be used for all coordinate and image transformations (avoiding the use of nonlinear trigonometric functions and greatly speeding up/simplifying analysis). The computations for each 2-D angular slice can be parallelized, so that a separate CPU calculates each slice if desired. FIG. 15 schematically illustrates the computational flow.

Figure 19:
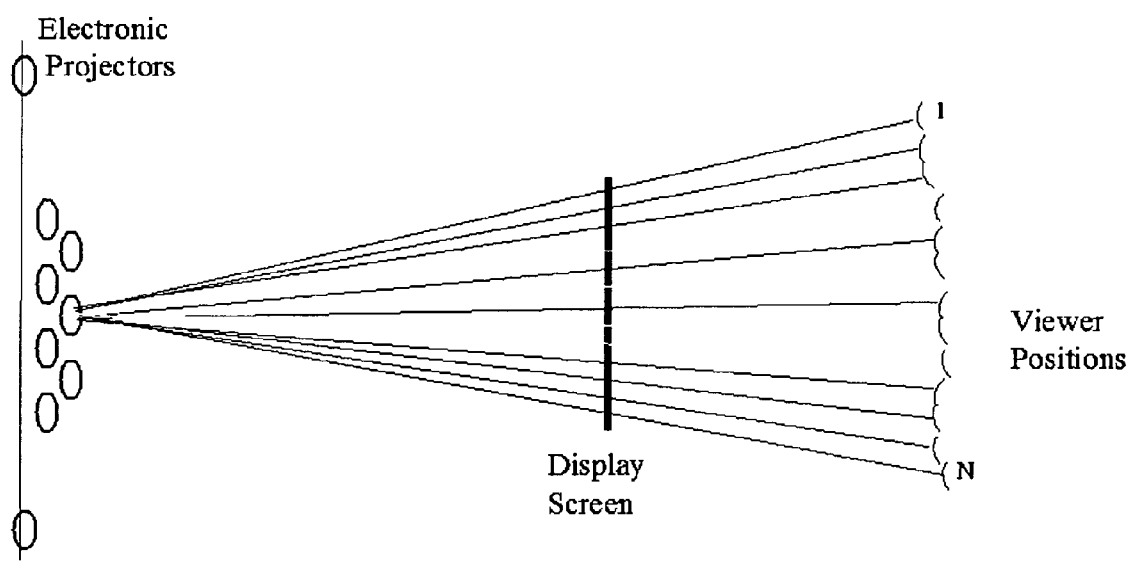
FIG. 19 Two algorithms for image rendering have been developed by TDT for the Angular Slice 3D Display. As illustrated, one algorithm creates the image to be projected from a particular projector by rendering one vertical stripe from each of N different viewer positions. The vertical stripes from the N viewer positions are combined into a single projector image. This must be done for each projector. An alternative algorithm renders a projector image by ray-tracing through the 3D dataset from the projector position through the screen to the viewer positions (data objects can be in front of or behind the screen). This algorithm requires inverted hidden line removal—that is rather than the screen pixel taking on the characteristics of the object closest to the projector (as when ray-tracing from the viewer's position) the pixel takes on the characteristics of the object farthest from the projector. For the situation of transparent objects the pixels are blended from the combined objects for either algorithm. The projector viewpoint algorithm is simpler to implement when the graphics card hardware can be programmed to perform inverted hidden line removal.

Rendering algorithms from the viewer's point of view and from the projector's point of view have been reviewed in the previous discussion of FIG. 19.

A sample DirectX rendering program for 60 different angular views separated by one degree has been produced.

Software Simulation

Figure 16:
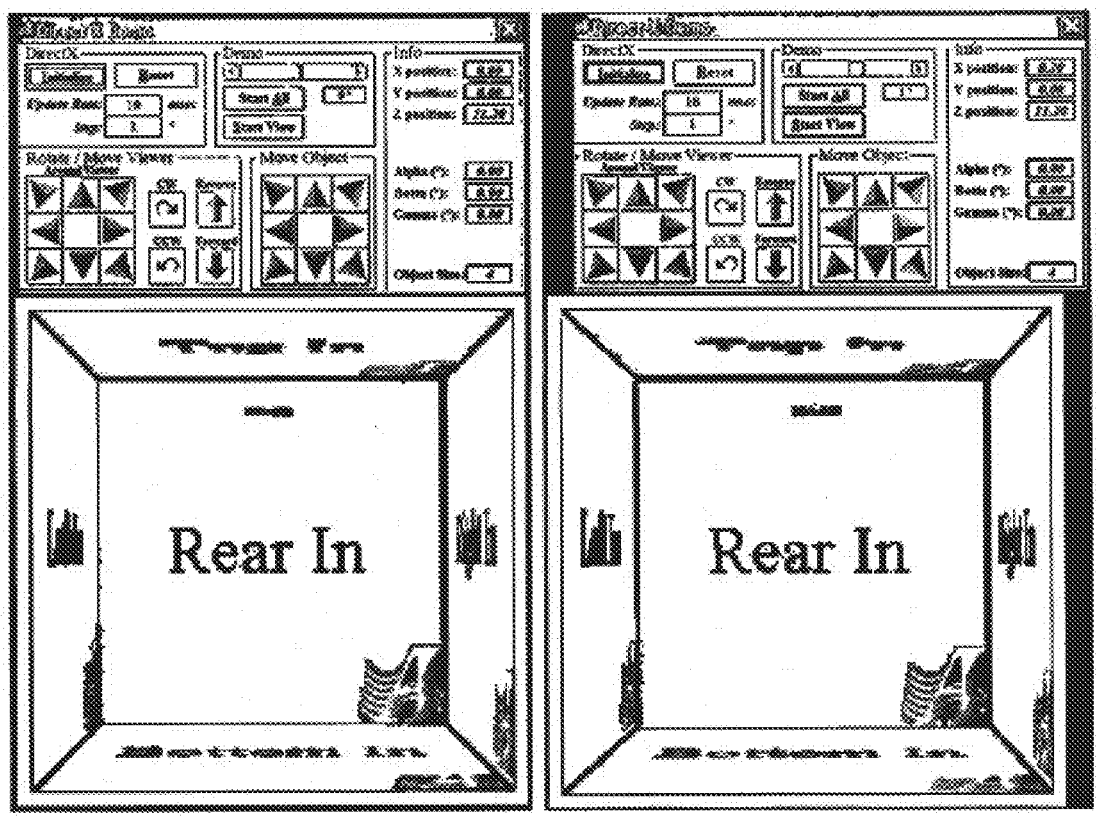
FIG. 16 presents images of a cube separated by one degree, from the software demonstration program used to illustrate renderings with one degree difference in viewpoint. The cube center is 11.20 units from the center of the screen and has been moved by one degree between screen shots (as measured from the screen), corresponding to a 0.1955 units move in X.

In order to further demonstrate what the quality of image from an Angular Slice Display with one-degree resolution would look like, a software demonstration was also developed. FIG. 16 shows two screen shots captured from the Software Demo where the point of view from the screen has been changed by one degree relative to the viewing object (cube). The virtual object (cube) center is located 11.20 units from the center of the screen for the shots shown and the cube is four units on each exterior side. The height of the screen itself is 1 unit, so that the units are always relative to the screen size being used for display (full screen height not captured in these screen-capture shots). Note that the x-position of the object has changed by 0.20 units between the two screen-captures, which corresponds to the sine of one degree times the 11.20 unit distance from the screen. Closer objects would move less and the demo allows for the object to be moved closer or further away. In action the demo shows that the one-degree resolution allows for a very pleasing transition between views.

Near Field of View Limit

As the eyes move closer to the display, the display usefulness will be limited, if by nothing else, then just by the ability of the eye to focus. In a 2-D display, this is the typical absolute limit—for instance text can still typically be read up to the limit where the eye loses focus. On the other hand, approaching closer to the display stops revealing any additional detail at some point, and starts revealing additional unwanted artifacts such as pixel edges. The useful distance of closest approach to a 2-D display (distance where no further detail can be perceived or where pixel artifacts start to be easily perceived) is typically 20 to 30 inches (500 to 750 mm) for a display with 250 micron pixels. Even at this distance, the typical well-corrected human eye could appreciate further detail, but the 2-D display in general serves its purpose well at this distance.

For the Angular Slice 3-D Display, this limit holds as well. Additionally, as the eye moves closer to the display, the available view of the display will be limited. Given the narrow (one-degree) proposed horizontal angular spread per angular slice, it must essentially be possible to draw a line in a horizontal plane from the eye to a vertical projection of a lens illuminating that pixel if the pixel is to be seen. If we insist that at least half the display be visible to the viewer at closest approach, then the useful distance of closest approach will be limited by the number of one-degree angular slices used to illuminate the screen, and by the angle to the lenses from the center pixel and from the edge pixel. The geometry of the lenses is essentially governed by the magnification from the micro-display (DMD device) to the screen, and the f/# of the lens. For the 0.55" SVGA TI devices, the allowable illumination is about f/2.4, and the magnification to fill a 20" diagonal screen is about 36. For the designs displayed above, the distance of the lens to the screen is about 750 mm (~30"), which is required to maintain the f/# as designed. This establishes the lens horizontal extent as the lens distance times the tangent of the angle or about ±433 mm (750×tan(30), or ~±17") for illumination of the central pixel at ±30 degrees.

For a 4:3 aspect ratio screen the minimum viewing distance from a centered position to see every pixel of the 20" display as described above would be about 24". From a centered position the minimum useful viewing distance would be governed by pixel artifacts. The viewing cone to see half the screen would be ±30 degrees, measured from the central pixel of the screen.

Figure 17:
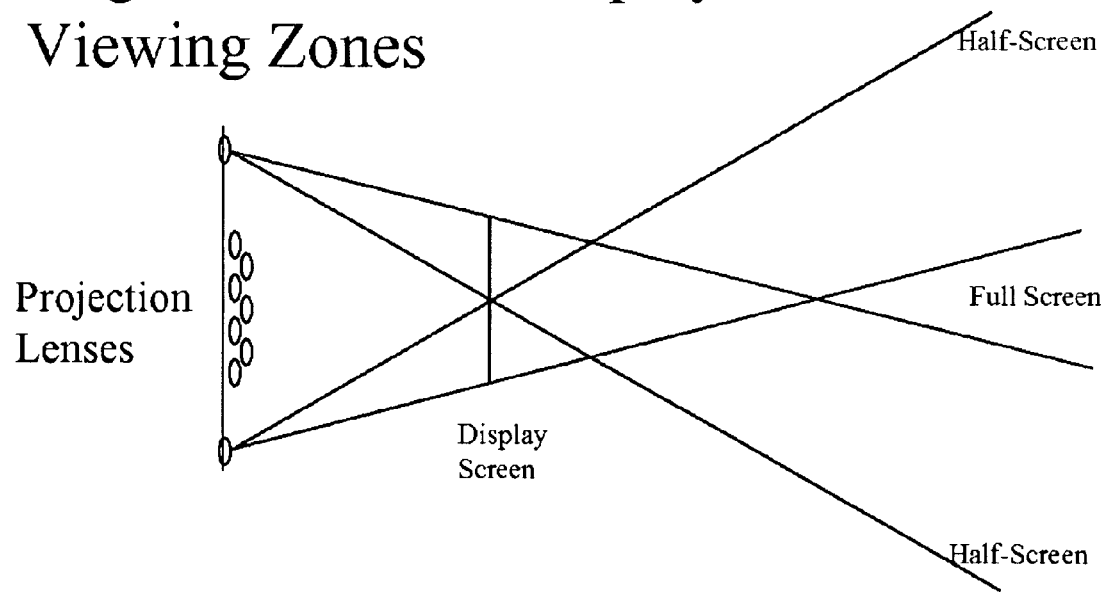
FIG. 17 provides a viewing Zones schematic for the Angular Slice Display. Viewers between the half-screen and full-screen lines can see more than half of the display. Viewers in the area between the two full-screen lines can see all of the display. If a line drawn from a viewer's eye through a pixel strikes the vertical projection of a lens within the horizontal diffusion angle, then the viewer can see that pixel.
Figure 18:
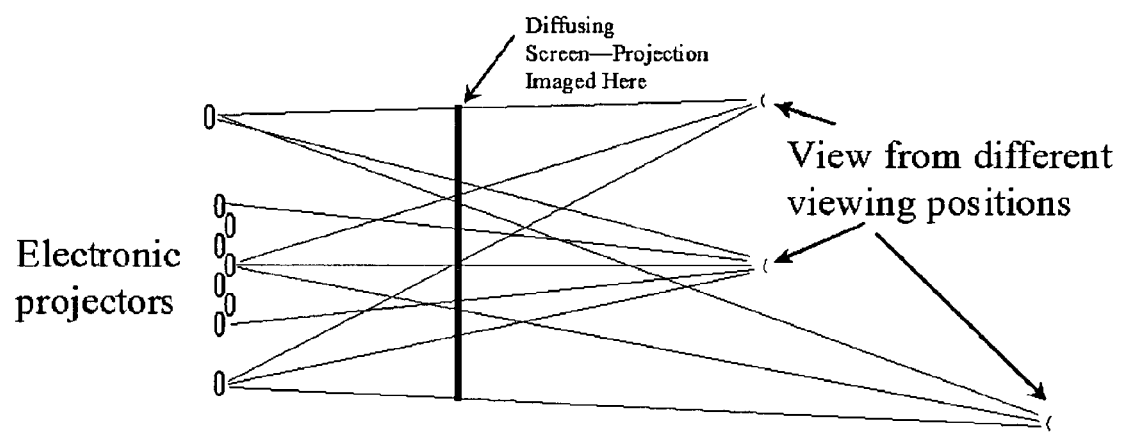
FIG. 18 illustrates the concept of what a viewer sees from different positions for a particular Angular Slice setup. The basic concept is that a viewer sees an angular slice/vertical stripe from a projector when a line within the diffusion angle(s) from the viewer's eye to the projector lens passes through the diffusing display screen. For HPO, as the viewer moves around, the vertical stripe seen from a particular projector changes. The width of the stripe increases and decreases as the viewer's distance from the screen increases and decreases. Widening and narrowing of the vertical stripes as the viewer changes distance from the display screen is entirely consistent with and part of look-around viewing (horizontal parallax)—a particular horizontal angle occupies a larger screen area as the viewer moves further away—length times angle equals screen width. Once the angular slices are all aligned and registered to one another for a particular viewing position, they remain aligned and registered as the viewer moves around.

The viewing zone situation is illustrated schematically in FIG. 17. All viewers inside the defined central pixel FOV cone (e.g., ±30 degrees for this example, 60-degree FOV), in the two cones between the full-screen and half-screen lines can see more than half of the display (an eye exactly on one of the "half-screen" lines would see exactly half of the display). All viewers inside the cone defined by the angle between the outermost projection lens and the outermost pixel on each side can see 100% of the display screen.

Maximum Useful 3-D Viewing Distance

The maximum useful viewing distance for a 2-D display is for instance the distance where typical sized text is no longer readable, or where features on a face might no longer be distinguishable (obviously this is somewhat subjective and related to whatever object or scene is being viewed). For a 3-D display these conditions certainly still hold, but there is also a distance where reasonable movement of the head no longer reveals any new pixels (pixels that were not seen before due to being "hidden" by some other object). Alternatively, the maximum useful distance for 3-D viewing might be defined as the distance where the one-degree angular slice from a single pixel fills both eyes. Since reasonable head movements are somewhat larger than the interpupillary distance (typically 55 to 75 mm), take 6" (150 mm) as a reasonable head movement to see a new pixel. In this case, for a one-degree angular slice, the maximum useful 3-D viewing distance for seated viewing would be about 8.6 meters, or around 28 feet. Note that since pixels are "continuous" in the Angular Slice Display (each pixel has a full-width-half-maximum of about one degree—they don't vary in a binary fashion) even at this distance both eyes are not seeing the same scene for all pixels. In more or less continuous fashion the scene will vary as the head is moved, even at the 28-foot distance. There will be a gradually diminishing 3-D effect (slightly different views in each eye) out to considerably larger distances.

Advantages of the Exemplary Embodiments

An Angular Slice True 3-D Display system, representing one embodiment of the invention is cost effective and advantageous for at least the following reasons. It provides a true three-dimensional representation of the image with all hidden lines removed (objects cannot be seen behind other opaque objects), just as viewing a real object would provide. Alternatively, software can also allow objects to be transparent (see through to hidden lines) if desired. As the viewer moves her head the scene changes continuously, just as the view through a window would. Each eye sees a different view of the scene, which provides stereopsis so that a true three-dimensional effect is achieved. Unlike a window separating the viewer from the world however, objects can also be displayed in front of the viewing screen with the same stereopsis and 3-D effect. The display makes it possible to view 3-D medical data in true 3-D display and to instantly understand the geometric relationship of organs in the body and immediately see and understand where there might be lesions or other problems inside of the body (e.g., review CT data, MRI data, PET scan data, or data from other 3-D imaging modalities). The display makes it possible to review engineering graphics in true 3-D so that it is possible to appreciate the workings of a device and where clearances or maintenance access are not adequate, and to otherwise appreciate how the engineering design might need to be modified to make it more serviceable, maintainable, or otherwise reduce the production/maintenance costs. The display makes it possible to add reality to training exercises or simulations and make them more lifelike. The display is a projection display and not a volumetric display and is therefore suitable for larger audiences and for some degree of interactivity. The display makes games, movies, and other display entertainment more lifelike and therefore more enjoyable and absorbing for the user.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

REFERENCES

1. G. E. Favalora, R. K. Dorval, D. M. Hall, M. G. Giovinco, J. Napoli, "Volumetric three-dimensional display system with rasterization hardware," in Stereoscopic Displays and Virtual Reality Systems VIII, Andrew J. Woods, Mark T. Bolas, John O. Merritt, Stephen A. Benton, Editors, Proceedings of SPIE Vol. 4297, p. 227-235 (2001).
2. Sullivan, A., "A Solid-state Multi-planar Volumetric Display", SID Digest 2003, paper 58.3, p. 354-356 (2003).
3. F. Okano, H. Hoshino, J. Arai, M. Yamada, and I. Yuyama, "Integral Three-Dimensional Video System", Proceedings of SPIE, Vol. CR76, Three-Dimensional Video and Display: Devices and Systems, pp 90-116 (2001).
4. Gabor, D., "Microscopy By Reconstructed Wavefronts", Proc. Roy. Soc. London Ser. A A197, p. 459 (1949).
5. Leith, E., and Upatnieks, J., "Reconstructed Wavefronts and Communication Theory", J. Opt. Soc. Am. 52, p. 1123 (1962).
6. Leith, E., and Upatnieks, "Wavefront Reconstruction With Continuous Tone Objects", J., J. Opt. Soc. Am. 53, p. 1377 (1963).
7. Heflinger, L. O., Wuerker, R. F., and Brooks, R. E., "Holographic Interferometry", J. App. Phys, 37, p. 643 (1966).
8. Develis, J. B., and Reynolds, G. O., Theory and Applications of Holography, Reading, Mass., Addison-Wesley, 1965.
9. P. St.-Hillaire, M. Lucente, J. D. Sutter, R. Pappu, C. J. Sparrell, and S. Benton. "Scaling up the MIT holographic video system" Proceedings of the Fifth International Symposium on Display Holography (Lake Forest College, Jul. 18-22, 1994), SPIE, Bellingham, Wash., 1995.
10. Voelkl, E., Allard, L. F., and, Joy, D. C., Introduction to Electron Holography, New York: Kluwer Academic/Plenum Publishers, 1999.
11. M. Stanley, R. W. Bannister, C. D. Cameron, et. al., "100-Megapixel Computer-Generated Holographic Images From Active Tiling: A Dynamic and Scaleable Electro-Optic Modulator System, Proceedings of SPIE Vol. 5005, p. 247-258 (2003).
12. Balogh, T., "Method and Apparatus for Displaying Three-Dimensional Images", U.S. Pat. No. 6,201,565 Mar. 13, 2001.
13. Balogh, T., "Pixel Element for a Three-Dimensional Screen", U.S. Pat. No. 6,736,512, May 18, 2004.
14. Balogh, T., "Method and Apparatus for the Presentation of Three-Dimensional Images", U.S. Patent Application 20030058209, Mar. 27, 2003.
15. Balogh, T., "Method and Apparatus for Displaying 3D Images", U.S. Patent Application 20030156077, Aug. 21, 2003.
16. Eichenlaub, J., "Apparatus and Method for Generating and Projecting Autostereoscopic Images", U.S. Pat. No. 6,533,420, Mar. 18, 2003.
17. H. Nakumuna, H. Kamei, Y. Takaki, "Natural 3D display with 128 directional images used for human-engineering evaluation", Stereoscopic Displays and Virtual Reality Systems XII. Edited by Woods, Andrew J.; Bolas, Mark T.; Merritt, John O.; McDowall, Ian E. Proceedings of the SPIE, Volume 5664, pp. 28-35 (2005).
18. L. Cross, "Multiplex holography," paper presented at the annual meeting of the SPIE, San Diego, Calif., August, 1977.
19. D. J. DeBitetto, "Holographic panoramic stereograms synthesized from white light recordings," Applied Optics, V 8-8, pp 1740-1741, 1969.
20. M. King, A. Noll, and D. Berry, "A new approach to computer-generated holography," Applied Optics, V 9-2, pp 471-475, 1970.
21. M. Yamaguchi, N. Ohyama, and T. Honda, "Holographic 3-D printer," SPIE Practical Holography IV, SPIE Proceedings Vol. 1212, pp 84-92, 1990.
22. M. Halle, S. Benton, M. Klug, and J. Underkoffler, "The Ultragram: A Generalized Holographic Stereogram," SPIE Practical Holography V, 'SPIE Proceedings Vol. 1461, pp 142-155, 1991.
23. M. Klug, M. Halle, M. Lucente, and W. Plesniak, "A compact prototype one-step Ultragram printer," SPIE Practical Holography VII, 'SPIE Proceedings Vol. 1914, pp 15-24, 1993.
24. M. Klug, A. Klein, W. Plesniak, A. Kropp, B. Chen, "Optics For Full-Parallax Holographic Stereograms," SPIE Practical Holography XI, SPIE Proceedings Vol. 3011, pp 78-88, 1997.
25. M. Halle, and A. Kropp, "Fast computer graphics rendering for full-parallax spatial displays," SPIE Practical Holography XI, SPIE Proceedings Vol. 3011, pp 105-112, 1997.
26. Y. Awatsuji, Y. Matsuura, T. Shimizu, and T. Kubota, "Analysis of imaging characteristics and design of HOE considering light efficiency using the hologram CAD tool," SPIE Practical Holography XVI, SPIE Proceedings Vol. 4659, pp 121-128, 2002.
27. Javidi, B., Okano, F., Three-Dimensional Video and Display: Devices and Systems, Bellingham, Wash., SPIE Optical Engineering Press, 2001.
28. Ramo, S., Whinnery, J. R., and Van Duzer, T., Fields and Waves in Communication Electronics, Second Edition, New York: John Wiley & Sons, 1984, Chapter 5.
29. Jenkins, F. A., and White, H. E., Fundamentals of Optics, Fourth Edition, New York, McGraw-Hill, 1976.
30. Goodman, J. W, Introduction to Fourier Optics, Second Edition, New York, McGraw-Hill, 1996.
31. Born, M., and Wolf, E., *Principles of Optics, Seventh (expanded) Edition*, Cambridge: Cambridge University Press, 1999.
32. Yariv, A., *Optical Electronics, 3rd Edition*, New York: Holt, Rinehart and Winston, 1985.
33. Stover, J. C., *Optical Scattering: Measurement and Analysis, second edition*, Bellingham: SPIE OPTICAL ENGINEERING PRESS, 1995.
34. Thomas, C. E., et. al., "Direct to Digital Holography and Holovision", U.S. Pat. No. 6,078,392, Jun. 20, 2000. Other patents applied for.
35. Thomas, C. E., and Hanson, G. R., "Acquisition and Replay Systems for Direct-to-Digital Holography and Holovision", U.S. Pat. No. 6,525,821, Feb. 25, 2003. Other patents applied for.
36. Hanson, G. R., and Bingham, P. R., "Faster Processing of Multiple Spatially-Heterodyned Direct to Digital Hologram", U.S. Patent Application 20040212807, Oct. 28, 2004.
37. Hanson, G. R., Bingham, P. R., et al., "Two-Wavelength Spatial-Heterodyne Holography", U.S. Patent Application 20040213462, Oct. 28, 2004.
38. Hanson, G. R., Bingham, P. R., et al., "Recording Multiple Spatially-Heterodyned Direct to Digital Holograms In One Digital Image", U.S. Patent Application 20040213464, Oct. 28, 2004.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
    one or more 2-D image projectors; and
    a display screen optically coupled to said 2-D image projectors;
    wherein the 2-D image projectors are configured to project individual 2-D images substantially in focus on the display screen;
    wherein each pixel from each of the 2-D images is projected from the display screen into a small angular slice to enable a viewer observing said display screen to see a different image with each eye, wherein the image seen by each eye varies as the viewer moves his or her head with respect to the display screen
    wherein the display screen is diffusive with a diffusion angle $\alpha$ (full-width at half-maximum, FWHM) in the horizontal plane and a diffusion angle $\beta$ (FWHM) in the vertical plane;
    wherein the 2-D image projectors are arranged in one or more horizontal rows with a horizontal displacement angle substantially equal to $\alpha/2$ between each projector and the next least horizontally displaced projector in any of the rows, wherein the horizontal displacement angle is measured from the display screen.

2. The system of claim 1, wherein the 2-D image projectors consist of one or more modulated lasers and one or more scanning micro-mirrors optically coupled to the lasers, wherein the 2-D image projectors are configured to lenslessly project the 2-D images on the display screen.

3. A system comprising:
    one or more 2-D image projectors; and
    a display screen optically coupled to said 2-D image projectors;
    wherein the 2-D image projectors are configured to project individual 2-D images substantially in focus on the display screen;
    wherein each pixel from each of the 2-D images is projected from the display screen into a small angular slice to enable a viewer observing said display screen to see a different image with each eye, wherein the image seen by each eye varies as the viewer moves his or her head with respect to the display screen;

wherein the display screen is diffusive with a diffusion angle $\alpha$ (full-width at half-maximum, FWHM) in the horizontal plane and a diffusion angle $\beta$ (FWHM) in the vertical plane;

wherein the 2-D image projectors are arranged as elements in a horizontal and vertical matrix with a horizontal displacement angle substantially equal to $\alpha/2$ between adjacent horizontal elements of the matrix and vertical displacement angle substantially equal to $\beta/2$ between adjacent vertical elements of the matrix, wherein the horizontal and vertical displacement angles are measured from the display screen.

4. The system of claim 1, wherein the system is configured to generate each of the 2-D images from a perspective in a horizontal plane substantially geometrically equivalent to a position of the 2-D image projector projecting that image with respect to the display screen, wherein each of the 2-D images is provided to the corresponding projector without being divided into slices that are distributed to multiple ones of the projectors.

5. The system of claim 4, wherein the system is configured to convert video data streams into 3-D data and then render the 2-D images.

6. The system of claim 5, wherein the system is configured to anti-alias the rendered 2-D images according to an angular slice horizontal projection angle $\alpha/2$.

7. The system of claim 4, wherein the system is configured to obtain the 2-D images to be projected from video cameras.

8. The system of claim 7, wherein the system is configured to match a depth of field of the video cameras to an angular slice horizontal projection angle $\alpha/2$.

9. The system of claim 4, wherein the system is configured to render the 2-D images from a 3-D dataset.

10. The system of claim 9, wherein the system is configured to anti-alias the rendered 2-D images according to an angular slice horizontal projection angle $\alpha/2$.

11. The system of claim 1, wherein the system is configured to obtain each of the 2-D images from video data streams, to slice the 2-D images into vertical stripes and to distribute the vertical stripes from each of the 2-D images among the 2-D image projectors for 2-D image projection.

12. The system of claim 11, wherein the video data streams have a depth of field matched to an angular slice horizontal projection angle $\alpha/2$.

13. The system of claim 1, wherein the system is configured to anti-alias the rendered 2-D images according to an angular slice horizontal projection angle $\alpha/2$.

* * * * *